United States Patent [19]
Yokomizo

[11] Patent Number: 5,524,071
[45] Date of Patent: Jun. 4, 1996

[54] IMAGE SYNTHESIS APPARATUS WITH DESIGNATION OF COMMON AREAS IN TWO IMAGES

[75] Inventor: Yoshikazu Yokomizo, Kawagoe, Japan

[73] Assignee: Canon Kabushiki Kaisha, Tokyo, Japan

[21] Appl. No.: 232,458

[22] Filed: Apr. 22, 1994

Related U.S. Application Data

[63] Continuation of Ser. No. 87,114, Jul. 1, 1993, abandoned, which is a continuation of Ser. No. 742,161, Aug. 1, 1991, abandoned, which is a continuation of Ser. No. 181,311, Apr. 13, 1988, abandoned, which is a division of Ser. No. 858,078, Apr. 25, 1986, Pat. No. 4,750,212, which is a continuation of Ser. No. 369,634, Apr. 19, 1982, abandoned.

[30] Foreign Application Priority Data

| Apr. 20, 1981 | [JP] | Japan | 56-58574 |
| Apr. 20, 1981 | [JP] | Japan | 56-58575 |
| Apr. 20, 1981 | [JP] | Japan | 56-58576 |
| Apr. 20, 1981 | [JP] | Japan | 56-58577 |
| Apr. 20, 1981 | [JP] | Japan | 56-58578 |
| Apr. 20, 1981 | [JP] | Japan | 56-58579 |
| Apr. 20, 1981 | [JP] | Japan | 56-58580 |
| Apr. 20, 1981 | [JP] | Japan | 56-58581 |
| Apr. 20, 1981 | [JP] | Japan | 56-58582 |

[51] Int. Cl.$^6$ .............. G06K 9/36; G06K 9/46; H04N 1/387
[52] U.S. Cl. .............. 382/284; 382/282; 382/245; 358/450
[58] Field of Search .............. 382/56, 33, 41, 382/61, 284, 282, 283, 245, 317; 358/261.1, 427, 450; 395/148, 921, 114, 135; 348/584; H04N 1/419

[56] References Cited

U.S. PATENT DOCUMENTS

| 3,200,194 | 8/1965 | Rabinow | 178/6 |
| 3,347,981 | 10/1967 | Kagan et al. | 178/5 |
| 3,787,819 | 1/1974 | Busink | 340/172.5 |
| 3,828,319 | 8/1974 | Owen et al. | 358/261.1 |
| 3,976,982 | 8/1976 | Eiselen | 382/44 |
| 4,020,462 | 4/1977 | Morrin | 340/146.3 AE |
| 4,020,502 | 4/1977 | Hayami et al. | 358/80 |
| 4,121,196 | 10/1978 | Johnson et al. | 382/41 |
| 4,200,869 | 4/1980 | Murayama et al. | 340/723 |
| 4,231,069 | 10/1980 | Wellendorf et al. | 358/450 |
| 4,255,766 | 3/1981 | Matsuda et al. | 358/257 |
| 4,291,305 | 9/1981 | Kimura et al. | 340/734 |
| 4,317,114 | 2/1982 | Walker | 340/721 |
| 4,342,052 | 7/1982 | Rackley et al. | 358/450 |
| 4,426,731 | 1/1984 | Edlund | 382/56 |
| 4,434,603 | 2/1984 | Tanaka et al. | 381/48 |

FOREIGN PATENT DOCUMENTS

| 0117320 | 10/1978 | Japan | 358/450 |
| 0002781 | 1/1981 | Japan | 358/450 |
| 2061667 | 5/1981 | Japan | 358/450 |

OTHER PUBLICATIONS

Gonzalez, *Digital Image Processing*, Addison–Wesley (1992).

*Primary Examiner*—Leo Boudreau
*Assistant Examiner*—Matthew C. Bella
*Attorney, Agent, or Firm*—Fitzpatrick, Cella, Harper & Scinto

[57] ABSTRACT

This invention provides a method and an apparatus for synthesizing two image signals, at least one of which is run-length coded, at a high speed.

8 Claims, 21 Drawing Sheets

| FIG. 2A | FIG. 2B |

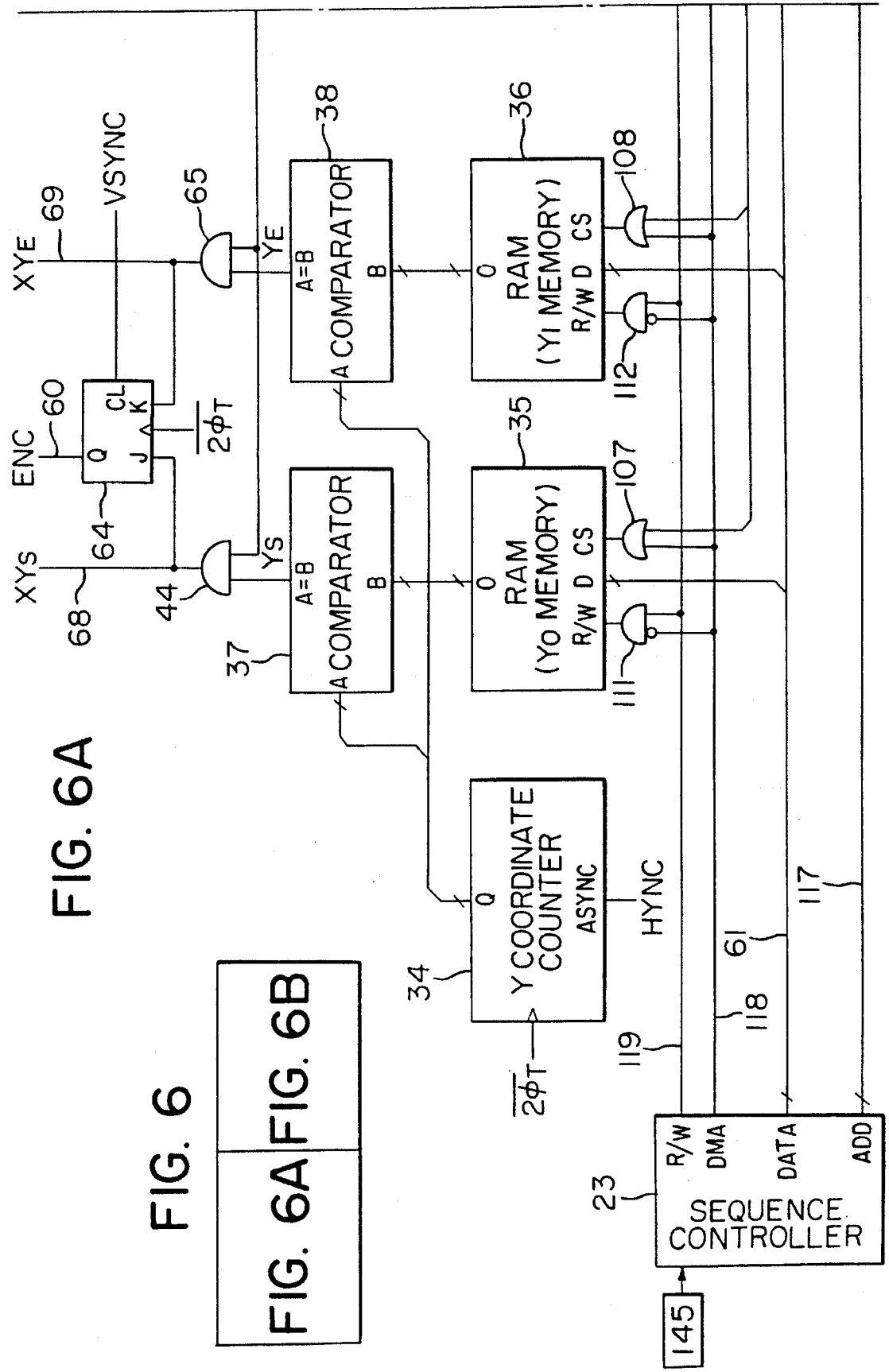

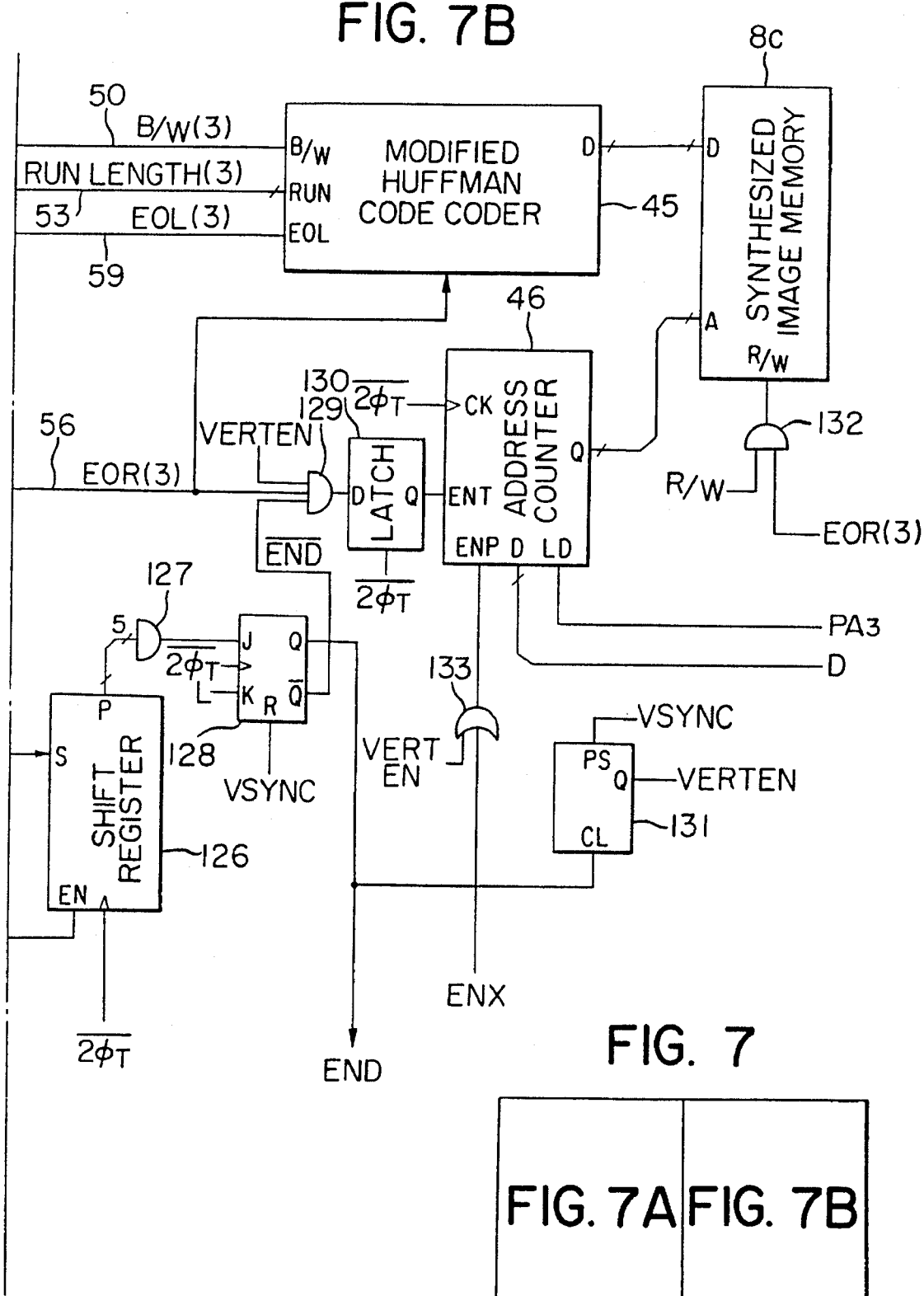

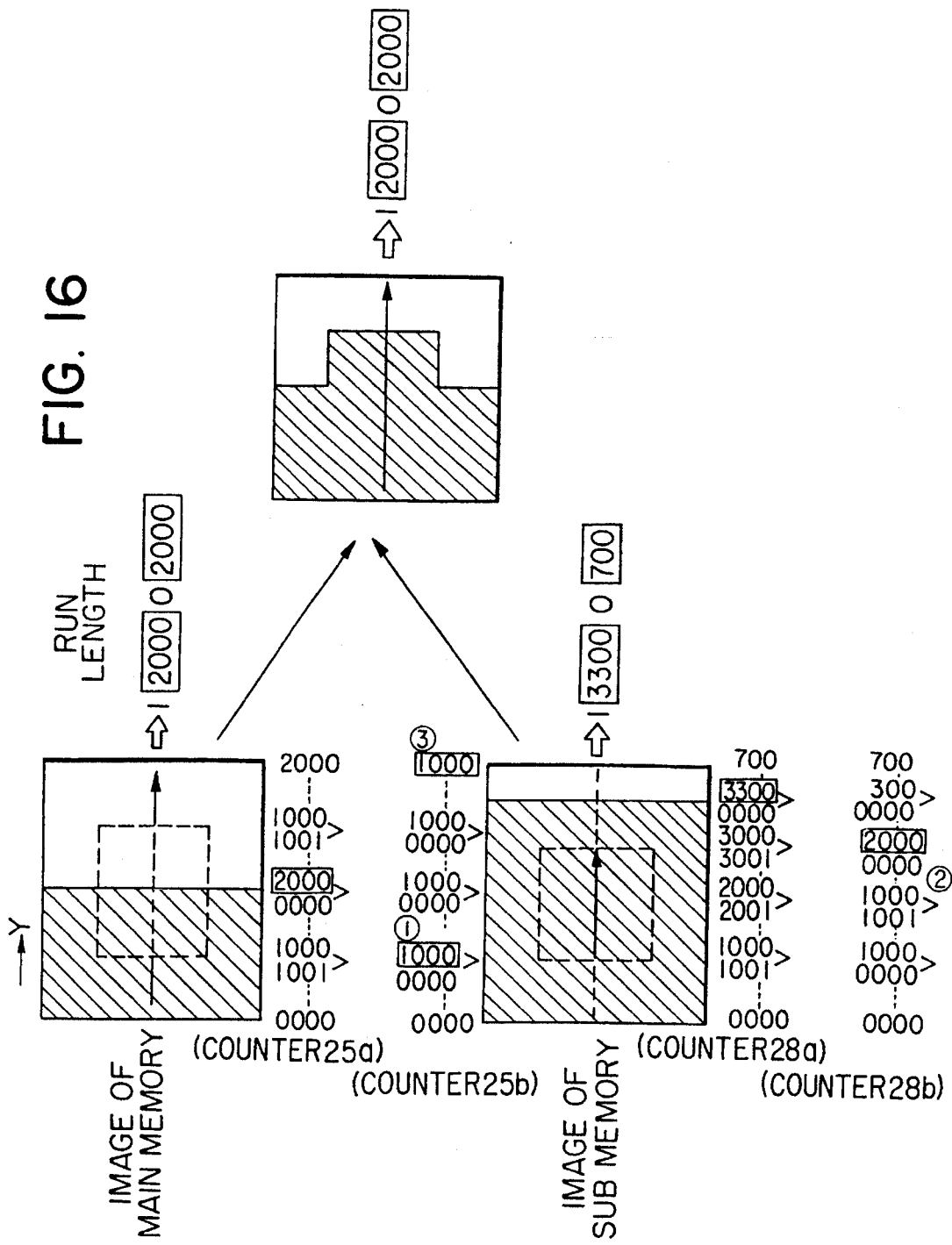

IMAGE SYNTHESIS APPARATUS WITH DESIGNATION OF COMMON AREAS IN TWO IMAGES

This application is a continuation of application Ser. No. 08/087,114 filed on Jul. 1, 1993, now abandoned which is a continuation of application Ser. No. 07/742,161, now abandoned, filed on Aug. 1, 1991, which is a continuation of application Ser. No. 07/181,311 filed on Apr. 13, 1988, now abandoned, which is a divisional of application Ser. No. 06/858,078 filed on Apr. 25, 1986, now U.S. Pat. No. 4,750,212 which is a continuation of application Ser. No. 06/369,634 filed on Apr. 19, 1982 now abandoned.

BACKGROUND OF THE INVENTION

1. Field of the Invention

The present invention relates to a method for processing image data and an apparatus therefor, and more particularly to such method and apparatus for synthesizing at least two image signals.

2. Description of the Prior Art

As an example of high-speed image synthesis there is already known that employed in the field of television in which a synthesized image can be obtained by receiving and storing the image signal of a program in a random-access frame memory while receiving and reproducing another program, reading the thus stored signal at a determined position in said other reproduced program, and switching two signals by a switching circuit. In such case said switching circuit can be composed of an analog switch since the image synthesis is basically effected between analog signals. Such conventional method is however not applicable to the run-length encoded signals obtained for example in facsimile devices.

As already known, the run-length encoding is employed for compressing the amount of continuous signals such as image signals. For example 320 consecutive white pixels, conventionally requiring a memory capacity of 320 bits, can be compressed in said encoding to less than 20 bits, i.e. several bits indicating white pixels and also several bits representing "320". The rate of compression can be further increased by so-called modified Huffman code with variable length. It has been difficult in the known art to synthesize such encoded and compressed signals.

Also computer processing, such as synthesis, of such encoded image signals has been quite slow.

SUMMARY OF THE INVENTION

The object of the present invention is to provide an image processing method and an apparatus therefor not associated with the above-mentioned drawbacks.

Another object of the present invention is to provide a method and an apparatus for synthesizing run-length encoded image signals.

Still another object of the present invention is to provide a method and an apparatus capable of a real-time high-speed image processing.

Still another object of the present invention is to provide a reproducing apparatus provided with a control circuit for synthesizing run-length encoded image signals;

Still another object of the present invention is to provide a method and an apparatus for compressing, encoding, synthesizing and reproducing document image signals;

Still another object of the present invention is to provide a method and an apparatus for partial synthesis of run-length encoded image signals stored in memories;

Still another object of the present invention is to provide a method and an apparatus for reproducing an image by synthesizing an image in a memory with an image of a scanned document.

Still another object of the present invention is to provide a method and an apparatus for synthesizing a run-length encoded image signal with an uncoded image signal.

Still another object of the present invention is to provide an improvement over an image reproducing method and an apparatus therefor in which the image reproducing position can be arbitrarily selected.

Still another object of the present invention is to provide an improvement over an image reproducing method and an apparatus therefor having plural image memories.

Still another object of the present invention is to provide an improvement over an image reproducing method and an apparatus therefor in which a document image is electrically read, processed and printed.

The foregoing and still other object of the present invention will be made fully apparent from the following description of the preferred embodiments.

BRIEF DESCRIPTION OF THE DRAWINGS

FIGS. 6, 6A and 6B are a block diagram of an X-Y coordinate detecting circuit;

FIGS. 7, 7A and 7B are a block diagram of a synthesized image compressor;

FIG. 11 is an explanatory view showing the synthesis of a main image and an auxiliary image;

FIG. 16 is an explanatory view of run-length;

DESCRIPTION OF THE PREFERRED EMBODIMENTS

Now the present invention will be clarified in detail by the following description of preferred embodiments to be taken in conjunction with the attached drawings.

Figure 1:
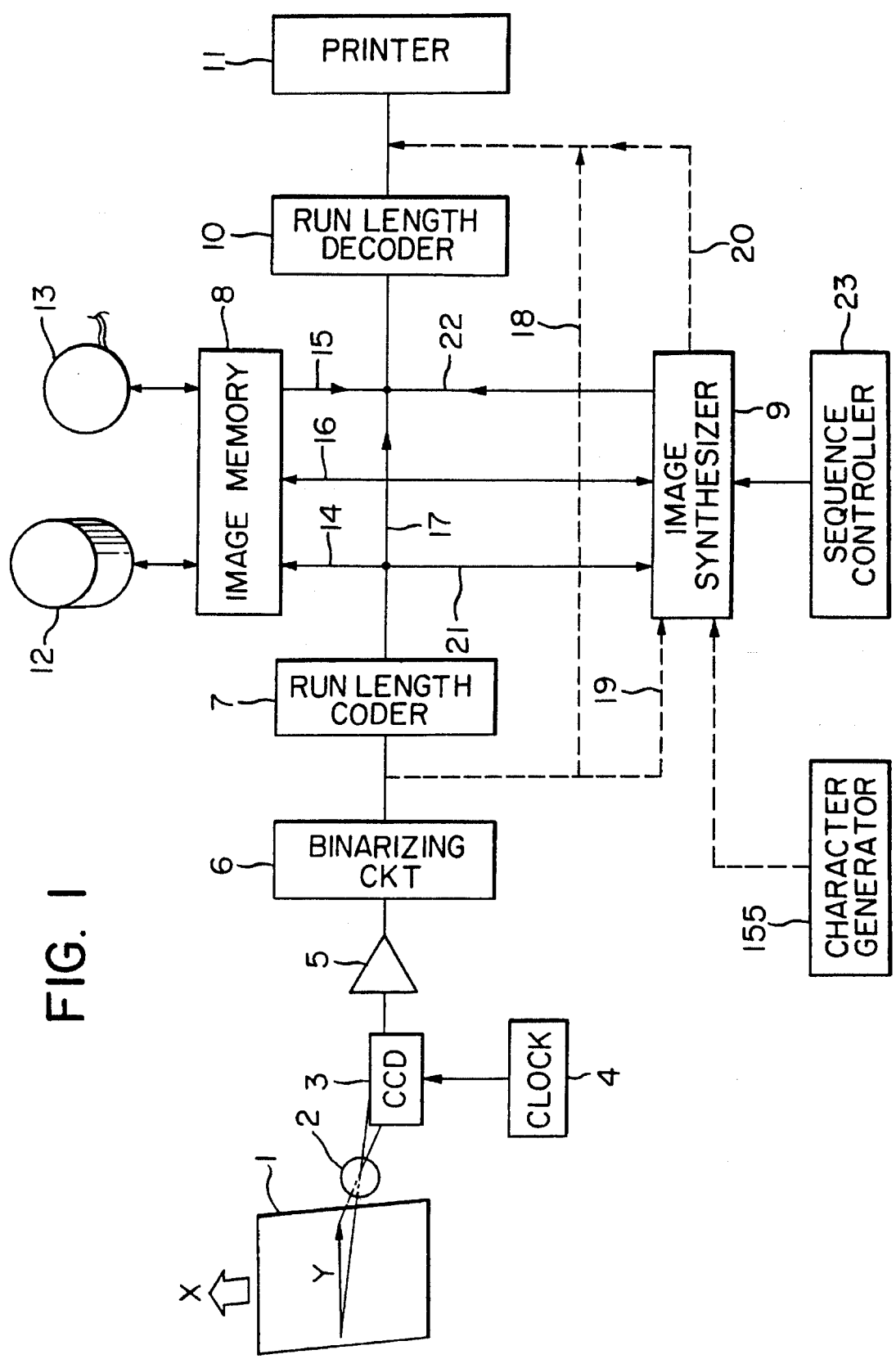
FIG. 1 is a block diagram showing the entire system of an image synthesizing apparatus embodying the present invention.

FIG. 1 shows the entire system of an image synthesizing apparatus of the present invention in a block diagram wherein an original document 1 is displaced in a direction indicated by a thick arrow, hereinafter referred to as the auxiliary scanning direction or X-direction, while it is illuminated by an unrepresented illuminating device. The image on said document 1 is focused through a lens 2 onto a solid-state linear imaging device 3 such as a charge-coupled device CCD. The thin arrow on the original 1 indicates the scanning direction of the CCD 3, hereinafter referred to as the main scanning direction or Y-direction, in response to clock signals from a clock generating circuit 4. There are provided a video amplifying circuit 5 for amplifying thus obtained video signal into a desired value, and a digitizing circuit 6 for digitizing said video signal into a binary signal. A run-length encoder 7, for example utilizing the modified Huffman's encoding according to the CCITT standard, is utilized for compressing said video signal as explained in the foregoing. An image memory 8, having a layered structure of at least three layers 8a, 8b, 8c as will be explained later and composed for example of a random access memory, is used in combination with a magnetic disk 12 and a magnetic tape 13 as auxiliary memories. An image synthesizing circuit 9 of the present invention has a function of extracting a particular part from one of for example two run-length encoded images and fitting said part into a determined part of the other image.

The signal encoded by the run-length encoder 7 is either transmitted through a signal line 17 to a run-length decoder 10 for decoding followed by printing in a printer 11, or through a signal line 14 to the image memory 8, then subjected to synthesis with a stored image in the image synthesizing circuit 9 through a signal line 16, released from a signal line 15 to the run-length decoder 10 for decoding and printed in the printer 11. Signal lines 21, 22 perform input and output of signals to and from the image synthesizing circuit.

A signal not requiring memory or synthesis as mentioned above is transmitted through the signal line 17, which is functionally equivalent to a signal line 18 bypassing the encoding circuit. The image synthesis can be effected not only on two images stored in the image memory 8 but also on a signal 21 or 19 obtained from the CCD 3 in combination with an already stored image supplied from a signal line 16. Also a synthesis of a stored image with a character image from a character generator 155 is possible. Furthermore the synthesized image may not only be stored in the image memory 8 but also be transmitted directly to the printer 11 through the signal line 22 or 20. A sequence controller 23 controls the function of the image synthesizing circuit.

Figure 2A:
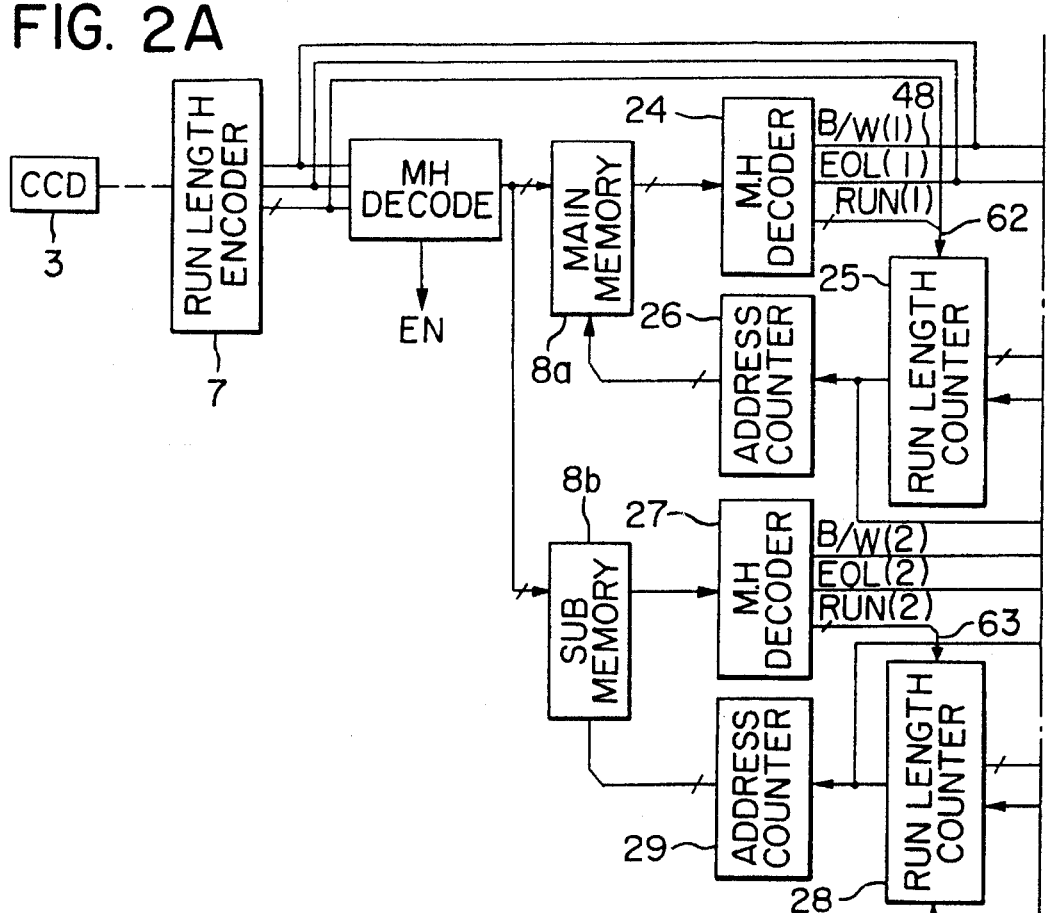
FIGS. 2, 2A and 2B are a block diagram showing the structure of an image synthesizing apparatus of the present invention.
Figure 2:
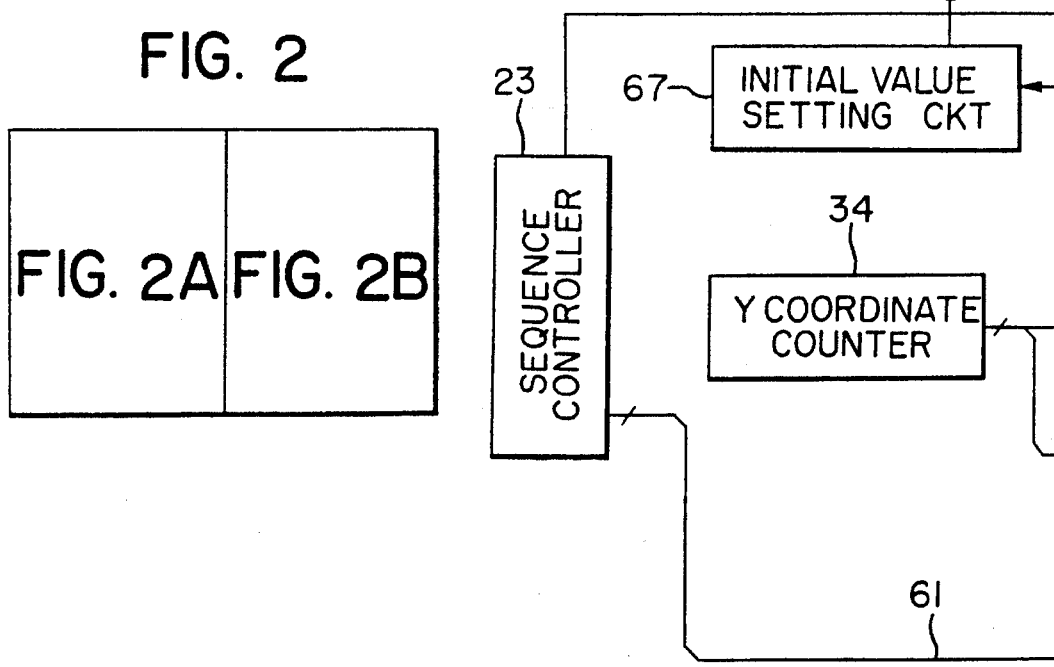
Figure 2B:
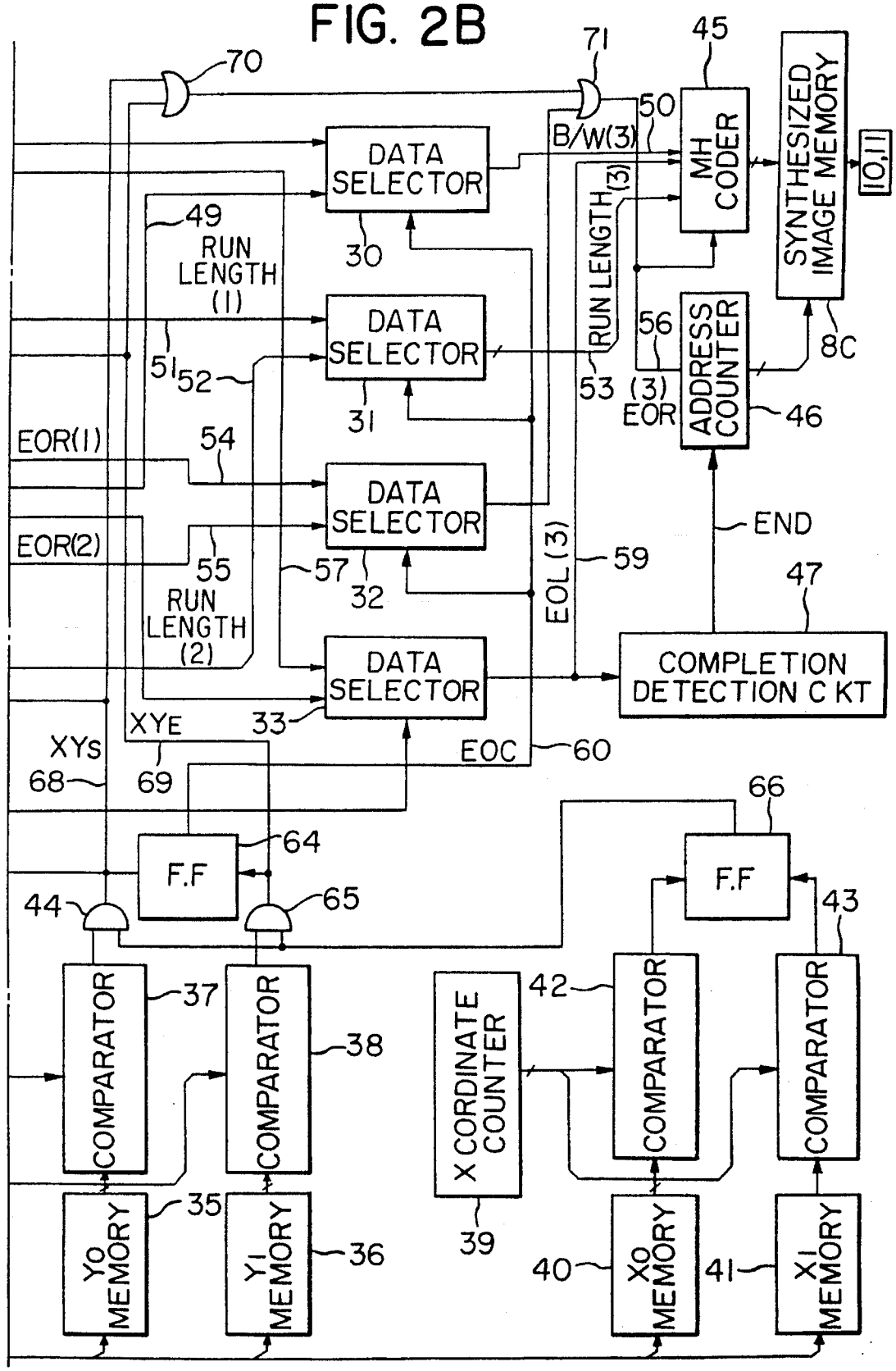

FIG. 2 is a block diagram showing the principal part of the image memory 8, image synthesizing circuit 9 and sequence controller 23 shown in FIG. 1.

The image memory 8 has a layered structure of at least three layers, divided into a main image memory 8a, an auxiliary image memory 8b and a synthesized image memory 8c, respectively provided with independent hardware address counters 26, 29 and 46 for enabling independent address access. It is naturally possible also to allot the addresses of said memories to a certain address space of the sequence controller 23 for enabling image data access by said controller. The memories 8a, 8b store the image signals from the CCD 3 in the form of run-length encoded signals obtained through the run-length encoder 7 and a modified Huffman (M-H)encoder. The address counters 26, 29 are advanced by enable signals EN supplied from the M-H encoder and through an unrepresented OR gate.

A modified Huffman (M-H) decoder 24 separates the main image stored in the form of run-length code into a main image video signal 48 (B/W(1)) for identifying black and white, a main image end-of-line signal 57 (EOL(1)) indicating the end of data of one line in the Y-direction, and a main image run-length signal 62 (RUN(1)) indicating the number of consecutive white or black bits. The numeral (1) attached to said signals indicates that said signals are related to the main image. Said signals 48, 57 and 62 are respectively supplied to data selectors 30, 33 and a run-length counter 25. The run-length counter 25 is advanced in synchronization with clock pulses 2$\phi$T and is reset when the count meets the run-length signal 62 (RUN(1)) from the M-H decoder 24. Simultaneously with said resetting the address counter 26 is started to read succeeding M-H encoded data from the main image memory 8a. Consequently the output signal 51 from the run-length counter 25 corresponds to the real time and is therefore referred to as the real-time main image run-length signal (RUN-LENGTH (1)). Also the signal 54 for resetting the run-length counter 25 is hereinafter called the main image end-of-run-length signal (EOR(1)). Said signals 51, 54 are respectively supplied to the data selectors 31, 32.

The auxiliary image signal is similarly decoded as explained in the foregoing, wherein an M-H decoder 27, a run-length counter 28 and an address counter 29 respectively correspond to the M-H decoder 24, run-length counter 25 and address counter 26 for the main image. An auxiliary image video signal 49 (B/W(2)), an auxiliary signal end-of-line signal 58 (EOL(2)) and an auxiliary image run-length signal 63 (RUN(2)) obtained from said M-H decoder 27 are respectively supplied to data selectors 30, 33 and the run-length counter 28. In a similar manner as explained in the foregoing, the run-length counter 28 generates an auxiliary image run-length signal 52 (RUN-LENGTH(2)) processed in real-time and an auxiliary image end-of-run-length signal 55 (EOR(2)) for resetting. Said signals 52, 55 are also supplied to the data selectors 31, 32. The numeral (2) attached to said signals indicates that said signals are related to the auxiliary image.

The foregoing various signals obtained from the main and auxiliary images are suitably selected by the data selectors 30, 31, 32, 33 in response to an EOC signal to be explained later to provide a synthesized image video signal 50 (R/W(3)), a real-time synthesized image run-length signal 53 (RUN-LENGTH (3)), a synthesized image end-of-run-length signal 56 (EOR(3)), and a synthesized image end-of-line signal 59 (EOL(3)), wherein the numeral (3) indicates that said signals are related to the synthesized image. Said signals 50, 53, 59 are supplied to an M-H encoder 45 for M-H encoding in response to the signal 56 (EOR(3)) as will be explained later, and thus encoded signal is stored in the synthesized image memory 8c addressed by an address counter 46.

The data selectors 30, 31, 32 are real-time selected by an enable-of-composite signal 60 (EOC) from a flip-flop 64 for effecting the image synthesis.

Figure 12:
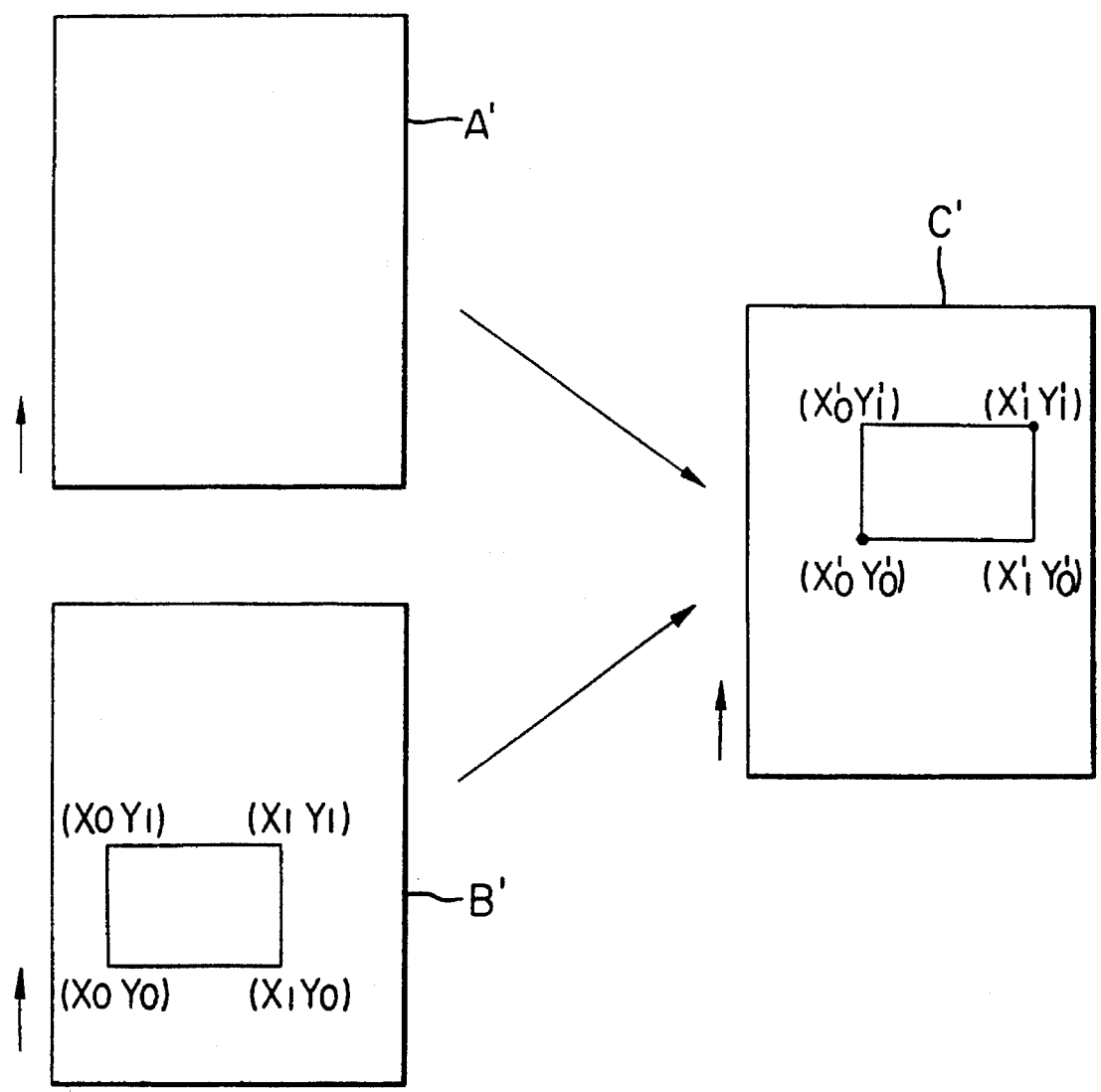
FIG. 12 is an explanatory view showing the principle of addressing in synthesis of a main image and an auxiliary image.

Said EOC signal is generated in the following manner. At first a start address Y0 for the Y-direction is stored in a Y-start address memory 35 through a data bus 61 of the sequence controller 23, and an end address Y1 is similarly stored in a Y-end address memory 36. Then a start address X0 for the X-direction is stored in an X-start address memory 40, and an end address X1 is stored in an X-end address memory 41. Said storages are for example conducted in response to the actuations of keys shown in FIG. 9. As shown in FIG. 12, said addresses Y0, Y1, X0 and X1 stored in the address memories 35, 36, 40 and 41 define a rectangular area in which the image is to be extracted from the auxiliary image. Then the clock pulses from the clock circuit 4 shown in FIG. 1 are counted, comparators 37, 38 compare the output signal from a Y-counter 34 indicating the position in the Y-direction with output signals Y0, Y1 from said memories 35, 36. Said comparators respectively supply enable signals for the Y-direction to gate circuits 44, 65 at Y0 and Y1. Similarly comparators 42, 43 compare the output signal from an X-counter 39 indicating the X-position of auxiliary scanning with output signals X0, X1 from said memories 40, 41 and respectively supply enable signals for X-direction to a flip-flop 66 at X0 and X1. The gate circuits 44, 65 generate logic products of the enable signals in the Y- and X-directions, and the aforementioned EOC signal 60 is obtained through a flip-flop 64. Consequently, in the positive logic, the EOC signal is at the high level when access is made to the interior of the rectangle in the auxiliary image shown in FIG. 12.

Then a synthesized image signal obtained from the synthesized image video signal 50 (B/W(3)), real-time synthesized image run-length signal 53 (RUN-LENGTH(3)) and synthesized image end-of-line signal 59 (EOL(3)) and encoded by the M-H encoder 45 is stored in the synthesized image memory 8c. The address counter 46 counts the signal EOR(3) for addressing said memory. Also when the signal EOR(3) is entered consecutively, for example five times, a completion detecting circuit 47 identifies the end of an image of a page and terminates the counting action of the address counter 46.

Figure 15:
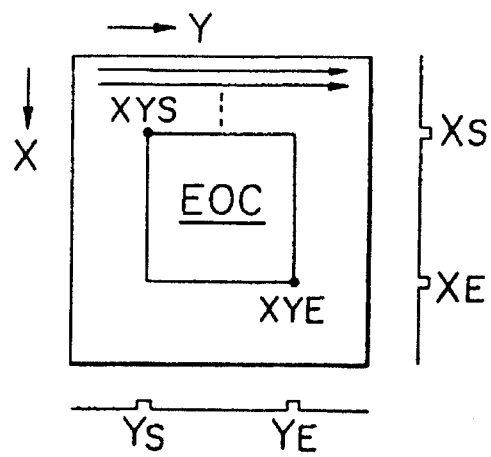
FIG. 15 is an explanatory view showing the addresses for image synthesis.

A synthesis start signal $XY_S$ from the AND gate 44 and a synthesis end signal $XY_E$ from the AND gate 65 are supplied through OR gates 71, 70 to the synthesized image end-of-run-length signal 56 (EOR(3)) in order that, when the image synthesis is conducted by the inversion of the channel switching EOC signal 60 during the counting action of run length by the counter 25 or 28, the run length in said counting action before said switching is no longer counted but encoded at said switching and stored in the memory 8c for step advancing the address counter 46. This operation is called a pre-process for synthesis. The aforementioned signals $XY_S$, $XY_E$ are generated corresponding to the synthesizing positions as shown in FIG. 15.

The run-length counters 25, 28 are respectively reset by the synthesis start signal $XY_S$ and the synthesis end signal $XY_E$, in order that, when the image synthesis is conducted by the inversion of the channel switching EOC signal 60 during a counting action of run length by the run-length counter 25 or 28, the run length in the image after said switching is counted only from said switching to the end of said run length. This operation is called a post-process for synthesis. These processes ensure continuity of the image at the channel switching.

The aforementioned pre- and post-processes enable a synthesis in real time basis of the run-length codes which are non-real-time data.

Figure 11:
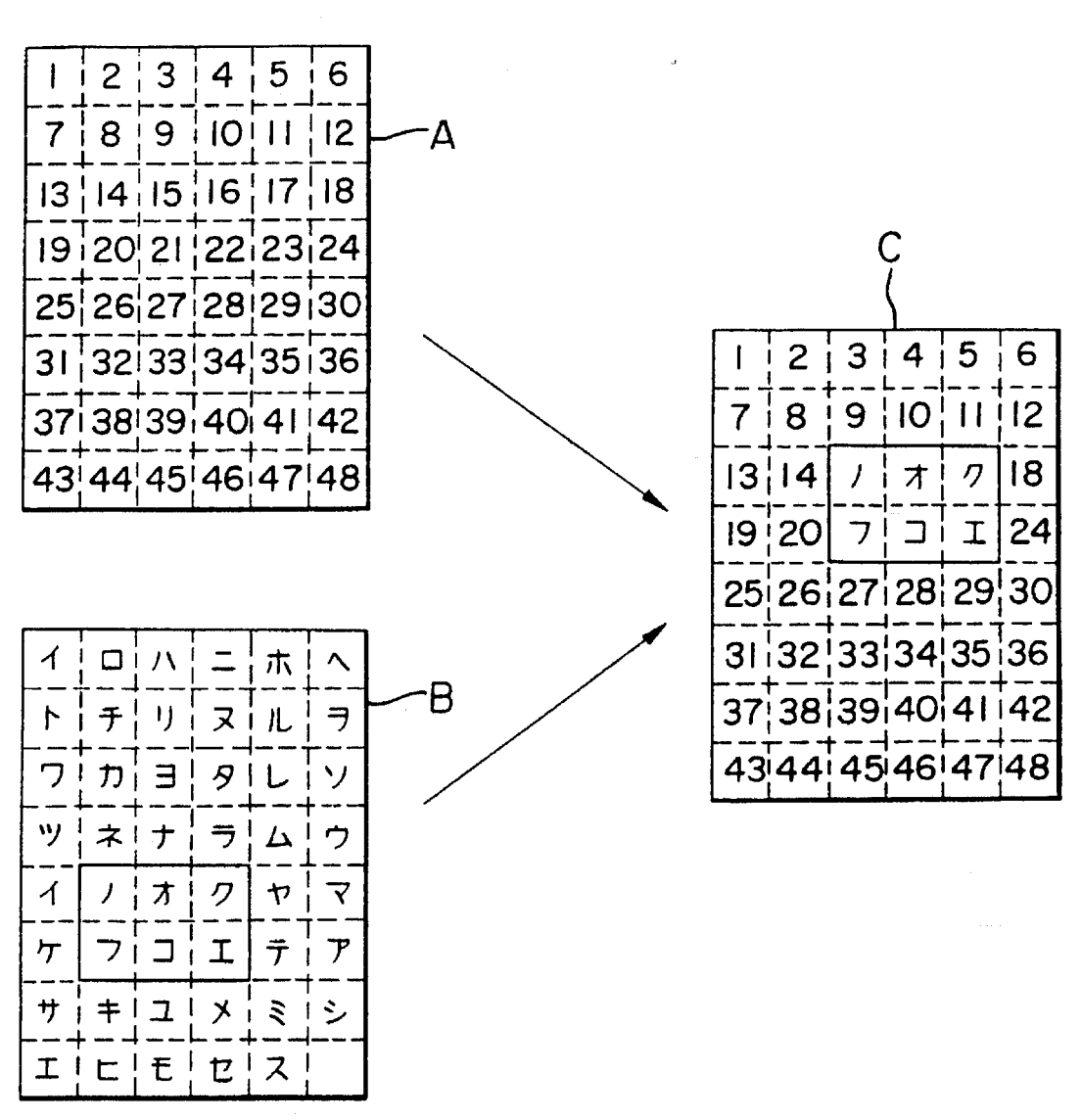

An initial value setting circuit 67 stores addresses for extracting the auxiliary image. The memories 35, 36, 40 and 41 initially store the coordinates Y0, Y1, X0 and X1 defining a rectangle in the auxiliary image shown in FIG. 12, through the controller 23. Then the image synthesis is experimentally conducted, and the initial value setting circuit 67 detects the inversion of the synthesis start signal $XY_S$ to the high level at (X0, Y0) to stop the run-length counter 28 and the address counter 29, thereby holding the run length and the address at this point. Then the coordinates Y0', Y1', X0' and X1' defining a rectangle in the synthesized image shown in FIG. 12 are stored in the memories 35, 36, 40 and 41. Then the image synthesis is conducted in the following manner. When the scanning of the principal image reaches (X0', Y0'), the stopped address counter for the auxiliary image memory is restarted to release the data of the auxiliary image starting from (X0, Y0). In this manner a part of the auxiliary image inside a rectangle defined by X0, X1, Y0 and Y1 as shown in FIG. 12 is fitted into a rectangular area defined by X0', X1', Y0' and Y1' in the synthesized image. The synthesis is conducted in a manner as shown in FIGS. 11 and 12 to obtain the corresponding synthesized image from the printer 11, wherein A, A' indicate the main image, B, B' the auxiliary image and C, C' the synthesized image. In this manner the present invention allows one to extract an image from an arbitrary position and to fit said image into an arbitrary position of another image. Also using an entirely white main image, it is possible to extract a part of the auxiliary image and to move it to an arbitrary position. As explained in the foregoing, the above-explained embodiment is based on the change of image position through the hardware structure by controlling the address counters in response to the data of coordinates. This concept and some other concepts are applicable not only to the run-length encoded data.

In case of synthesizing a document image currently read by the CCD 3 with a stored auxiliary image, the output signal from the run-length encoder 7 is processed in the similar manner as the processing for the signal from the main memory, and the controller 23 controls the addresses to interrupt the output from said main memory. In such case a signal HSYNC to be explained later corresponds to the start or end of a main scanning by the CCD, and another signal VSYNC corresponds to the start or end of the auxiliary scanning i.e. of a page. These signals have equivalent functions also in the synthesis of two stored images. Furthermore said signals can be made to correspond to the synchronizing signals for printing laser beam in the case of printing the synthesized data.

Figure 3:
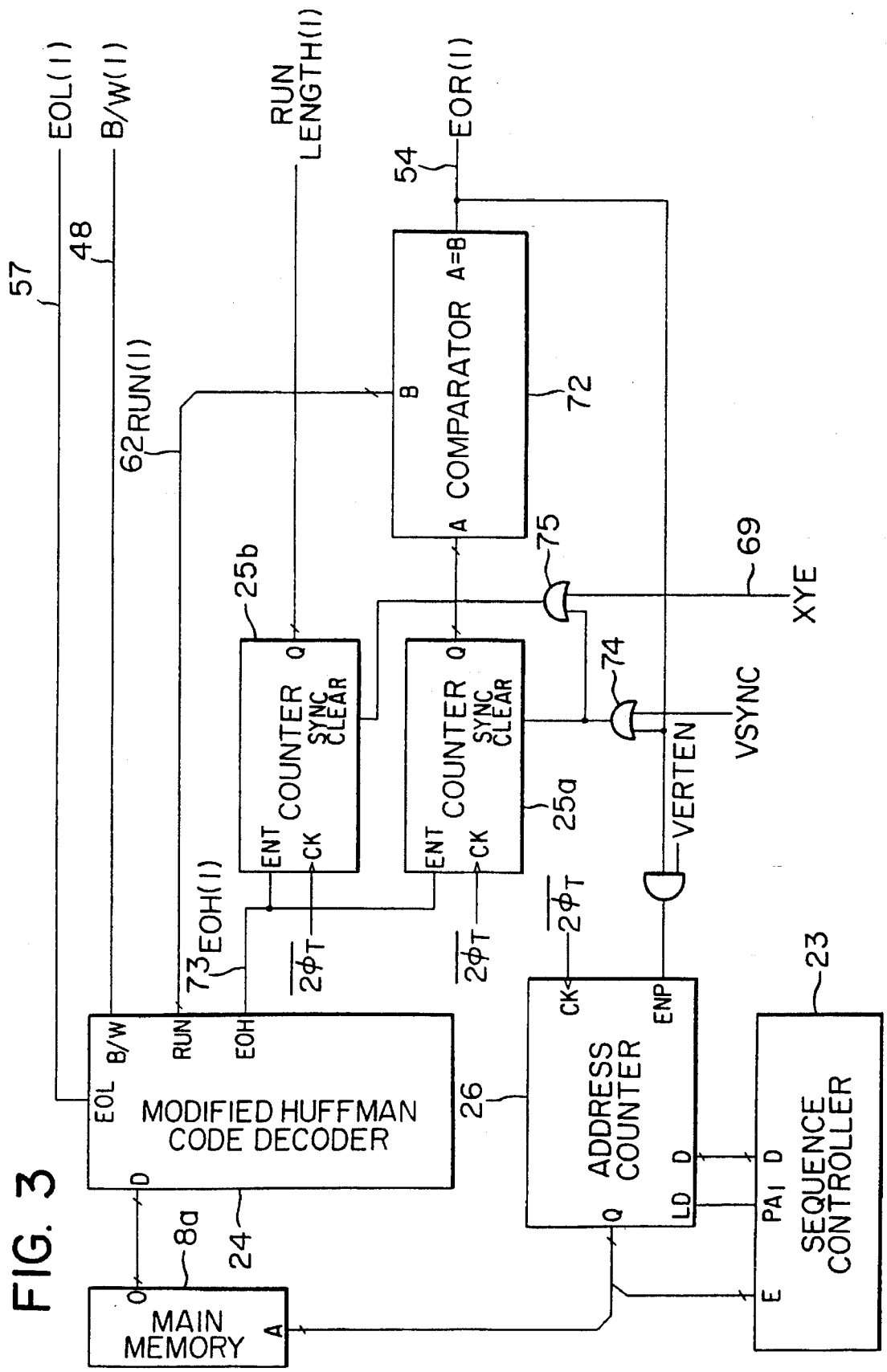
FIG. 3 is a block diagram of a main image data expander.

FIG. 3 is a more detailed block diagram principally showing the main image memory 8a, run-length counter 25 and address counter 26 shown in FIG. 2. In FIG. 3 the components the same as those in FIG. 2 are represented by the same numbers. The main image data stored in the main image memory 8a are decoded by the M-H decoder 24 into the video signal 48 (B/W(1)), run-length signal 62 (RUN(1)) and end-of-line signal 57 (EOL(1)).

A signal line 73 transmits an enable-of-Huffman signal EOH(1) which is shifted to the high level when the signals on the signal lines 48, 62 and 57 assume the enabling state. The run-length signal RUN(1) is supplied to an input port B of a comparator 72, so that counters 25a, 25b corresponding to the run-length counter shown in FIG. 1 simultaneously start counting of the clock pulses $2\phi T$ at the shifting of said enable signal EOH(1) to the high level. When the counter 25a counts up to the run length RUN(1), the output Q of said counter is supplied to the input port A of the comparator 72 whereby the output port A=B thereof provides a high-level end-of-run-length signal EOR(1) to a line 54. Simultaneously the address counter 26 is step advanced, and the counters 25a, 25b are reset through OR gates 74, 75. After the step advancing of the address for the memory 8a for releasing the succeeding data and after the completion of decoding by the M-H decoder 24, the signal EOH(1) is again shifted to the high level whereby the counters 25a, 25b start to count the run length corresponding to said succeeding data. Said counters usually function in the identical manner but the latter alone is reset upon receipt of the synthesis end signal $XY_E$ through a line 69. In such case the run-length signal RUN(1) corresponds to the count by said counter 25b after the entry of said synthesis end signal $XY_E$, thus performing the aforementioned post-process. An auxiliary scan synchronizing signal VSYNC resets the counters 25a, 25b at each end of the scanning in the X-direction. Also an auxiliary scan enable signal VERT EN assumes the high level only during the data processing to interrupt the counting action of the address counter 26 during other periods.

The sequence controller 23 is provided with signal lines 76, 77 for initializing the address counters, by setting a start address of a desired image out of plural images stored in the main image memory 8a. A signal line 156 supplies the count of the address counter 26 into the sequence controller in order to identify the capacity required for storing an image in the form of run-length code, and to confirm the size of stored images and the amount of entire images. FIG. 16 shows an example of a change in the run length count by the counters 25a, 25b, wherein a main image having 2,000 black bits and 2,000 white bits is synthesized with an auxiliary image having 3,300 black bits and 700 white bits in the central part thereof. In this case the synthesized run-length is obtained as 1,000 black bits (1) and 1,000 white bits (3) from the counter 25b. Also 2,000 black bits (2) are selected from the auxiliary image run-length counter 28b. Consequently the synthesized run length becomes composed of 3,000 black bits and 1,000 white bits taking the above-mentioned signals in the order of (1), (2) and (3).

Figure 4A:
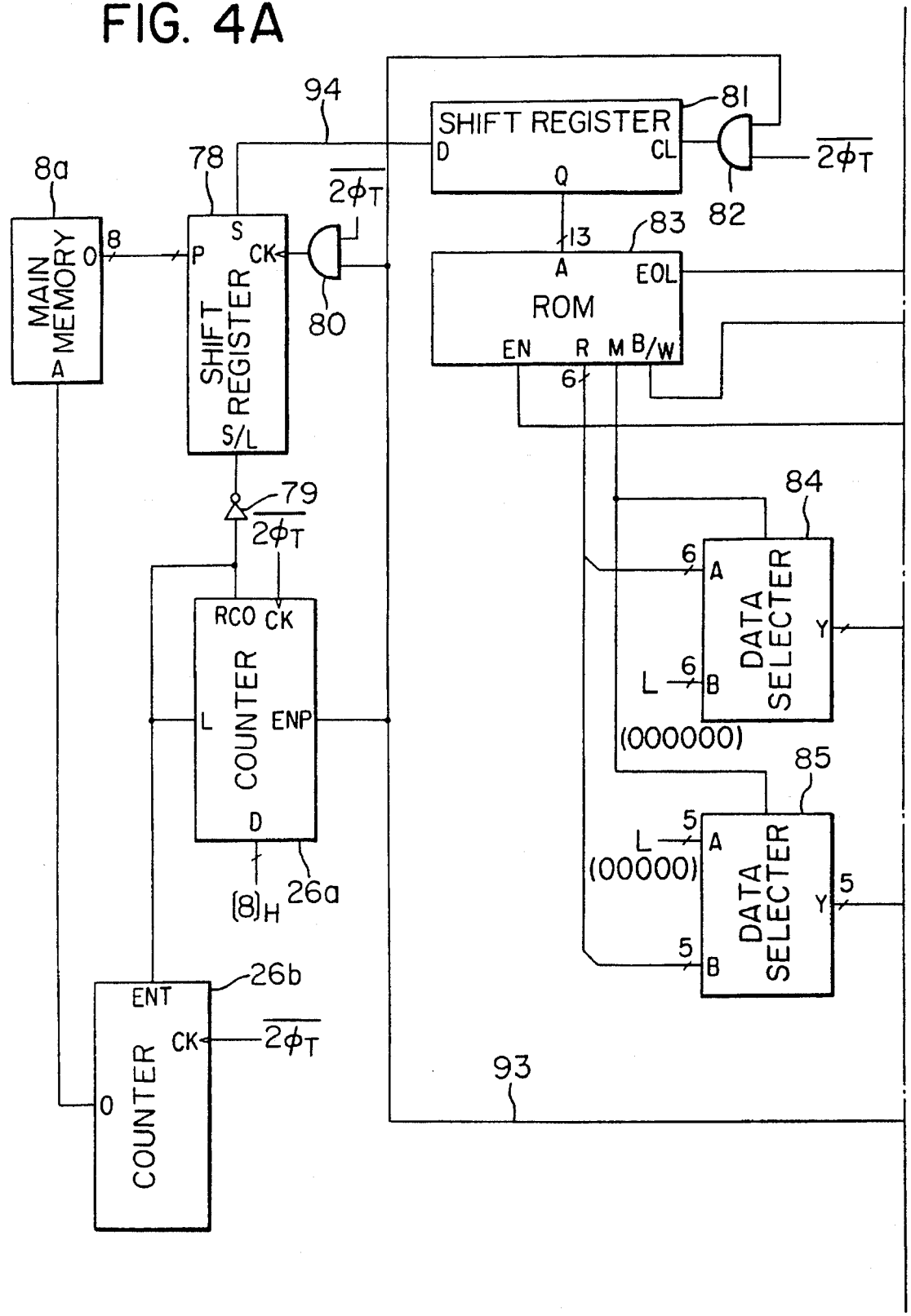
FIGS. 4, 4A and 4B are a block diagram showing an embodiment of a decoder for modified Huffman's code.
Figure 4:
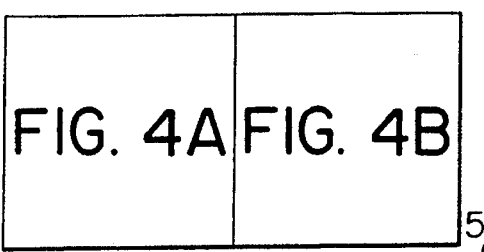
Figure 4B:
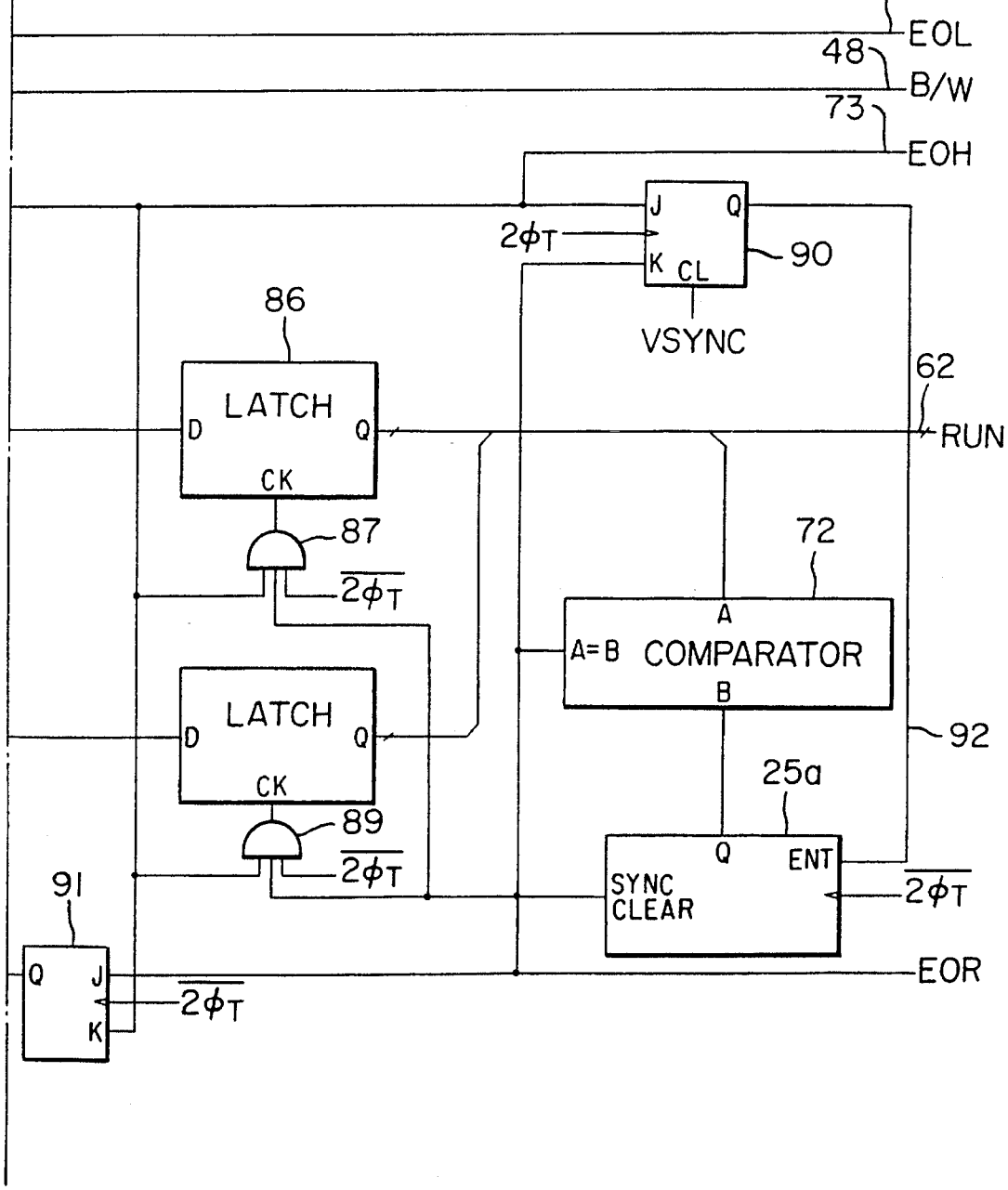

FIG. 4 is a detailed block diagram of the M-H decoder 24 and the address counter 26 shown in FIG. 3. The following explanation will be concentrated on the main image channel as it is identical with the auxiliary image channel.

The main image memory is for example composed of a structure wherein one byte is composed of eight bits. A parallel-in-serial-out shift register 78 converts parallel data into serial signals for supply to a shift register 81 through a signal line 94 in response to clock pulses $2\phi T$ supplied through an AND gate 80 when a shift enable signal 93 is at the high level. The octal counter 26a, constituting the address counter 26 shown in FIG. 3 in combination with the counter 26b, releases a high-level output signal RCO upon completion of 8-bit shifting of the shift register 78, thereby shifting said shift register 78 to the data parallel-loading mode through an inverter 79 and advancing the address counter 26b by one byte. Consequently, in response to a shift of the shift enable line 93 to the high level, a series of encoded image signals is supplied, in synchronization with the clock pulses $2\phi T$, through a signal line 94 to a serial-in-parallel-out shift register 81 having a length of 13 bits. A read-only memory (ROM) 83 is provided for converting the modified Huffman code, which is composed, according to the CCITT standard, of a code word for a white run, a code word for a black run, and a make-up code. The output signal from said ROM 83 is composed of a video signal B/W, a run-length signal R, a make-up code output signal M, an end-of-line signal EOL and an enable signal EN (EOH).

When the enable signal EN is shifted to the high level. by decoding of the data, a flip-flop 91 provides a low-level shift-enable signal 93 to close an AND gate 82, whereby the data shifting is interrupted and the data are latched in latches 86, 88 through AND gates 87, 89. In case the data represent a black or white run, the make-up code output signal M assumes the low level, whereby data selectors 84, 85 select input ports B thereof to reduce the upper 6 bits to zero and to allot the black or white run length to the lower five bits. Also if the data represent a make-up code, the make-up code output signal M assumes the high level whereby the data selectors 84, 85 select input ports A to reduce the lower 5 bits to zero and to allot the make-up data to the upper 6 bits. The number of data in the ROM 83 can be reduced in this manner. Consequently the run-length signal RUN is composed of 11 bits, in which the upper 6 bits and lower 5 bits are respectively constituted by the output signals from the latches 86 and 88.

A flip-flop 90 detects the enable signal EN from the ROM 83 in synchronization with the clock pulses $2\phi T$, and releases a high-level output signal 92 to initiate the counting function of the run-length counter 25a when gates 87, 89 are opened by the high-level enable signal EN to fix the outputs from the latches 86, 88. Subsequently, when the output signal from the run-length counter 25a becomes equal to the run-length signal RUN on the line 62, the comparator 72 releases a high-level output signal to reset the counter 25a, to shift the flip-flop 90 to the low-level output for terminating the counting action of the counter 25a, and to shift the flip-flop 91 to the high-level output for starting the shift of the succeeding image data. The decoding of the image data is effected by the repetition of the above-explained procedure.

Figure 5:
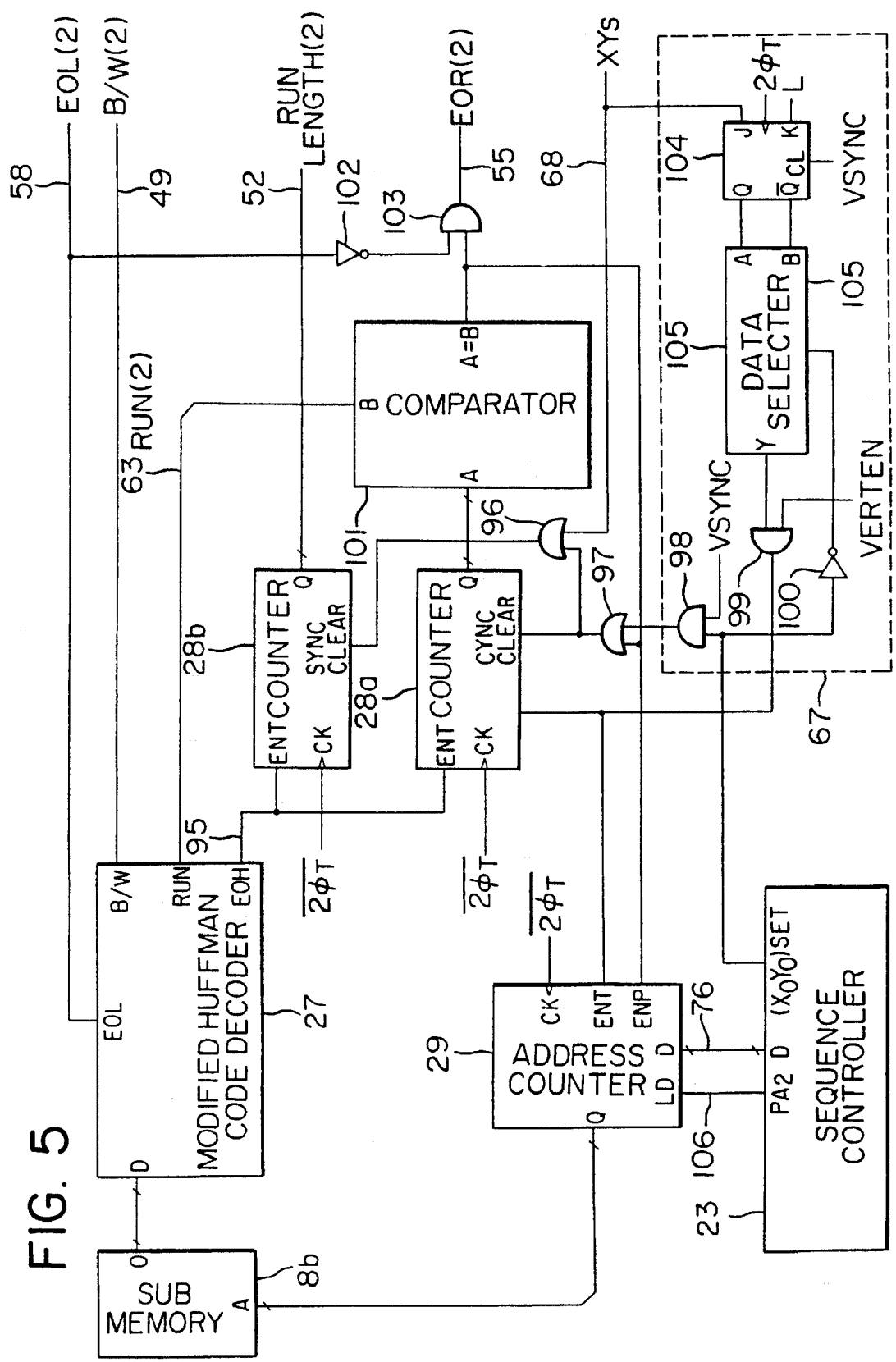
FIG. 5 is a block diagram of an auxiliary image data expander.

FIG. 5 is a detailed block diagram corresponding to FIG. 3 and showing principally the auxiliary image memory 8b, run-length counter 28 and address counter 29, wherein shown are an enable-of-Huffman signal 95 (EOH(2)); OR gates 96, 97; AND gates 98, 99; an inverter 100; a comparator 101; an inverter 102; an AND gate 103; a flip-flop 104; a data selector 105; and a signal line 106.

This circuit is different from that shown in FIG. 3 by the fact that the signal EOR(2) is not released by the inverter 102 and the AND gate 103 at the high-level state of the signal EOL(2), and that an initial value setting circuit 67, indicated by a broken-lined rectangle, is additionally provided. In the example shown in FIG. 12, the area to be extracted from the auxiliary image does not contain the signal EOL therein since said area is relatively small. However the signal EOL may be detected in case the extracted area extends to an end of the image or by a certain erroneous function. The detection of the signal EOL of the auxiliary image is not desirable since the present embodiment solely depends on the signal EOL of the main image. For this reason the aforementioned AND gate 103 interrupts the EOR signal, thereby preventing the EOL signal of the auxiliary image from storage in the synthesized image memory 8c.

In the trial image synthesis phase, an initial value setting signal (X0, Y0) SET from the sequence controller 23 is at the high level to open the AND gate 98 in the initial value setting circuit 67, and the data selector 105 controlled by the inverter 100 selects an input B from the flip-flop 104. Consequently the counters 28a, 28b, constituting the run-length counter 28 shown in FIG. 2, start counting action after the flip-flop 104 is reset by the signal VSYNC, and terminate said counting in response to the synthesis start signal $XY_S$ for extracting the auxiliary image, which shifts the output $\bar{Q}$ of the flip-flop 104 to the low level thereby shifting the input signal ENP to the counter 28a and the input signal ENT to the address counter 29 to the low level through the data selector 105 and the AND gate 99. Consequently the address counter 29 and the run-length counter 28a respectively store an address of the auxiliary data corresponding to the synthesis start position (X0, Y0) and the corresponding run-length position when the counting action is terminated. The main image memory is also scanned in said trial image synthesis phase, but this causes no inconvenience since the access to the synthesized image memory 8c is prohibited.

In the final image synthesis phase in which the initial value setting signal (X0, Y0) SET from the sequence controller 23 is at the low level, the counter 28a is not reset by the signal VSYNC since the AND gate 98 is closed. The address counter 29 and the run-length counter 28a retain the above-mentioned data even after the entry of the signal VERT EN since the data selector 105 selects the input A corresponding to the low-level output Q of the flip-flop 104 cleared by the signal VSYNC thereby closing the AND gate 99. Subsequently, at the shifting of the synthesis start signal $XY_S$ to the high level when the scanning proceeds to a point (X0', Y0') in the synthesized image shown in FIG. 12, the flip-flop 104 provides a high-level output Q to activate the counters 29 and 28a. Thus a signal indicating the point (X0, Y0) of the auxiliary image is released as the run-length signal RUN(2), which is further released as the run-length signal RUN(3) through the selector 31 shown in FIG. 2. The data of the main image are again released when the scanning proceeds to the point (X1', Y1') corresponding to the synthesis end signal $XY_E$. In this manner it is rendered possible to extract a partial image from an arbitrary position of the auxiliary image and fit said partial image into an arbitrary position of the main image.

Figure 6B:
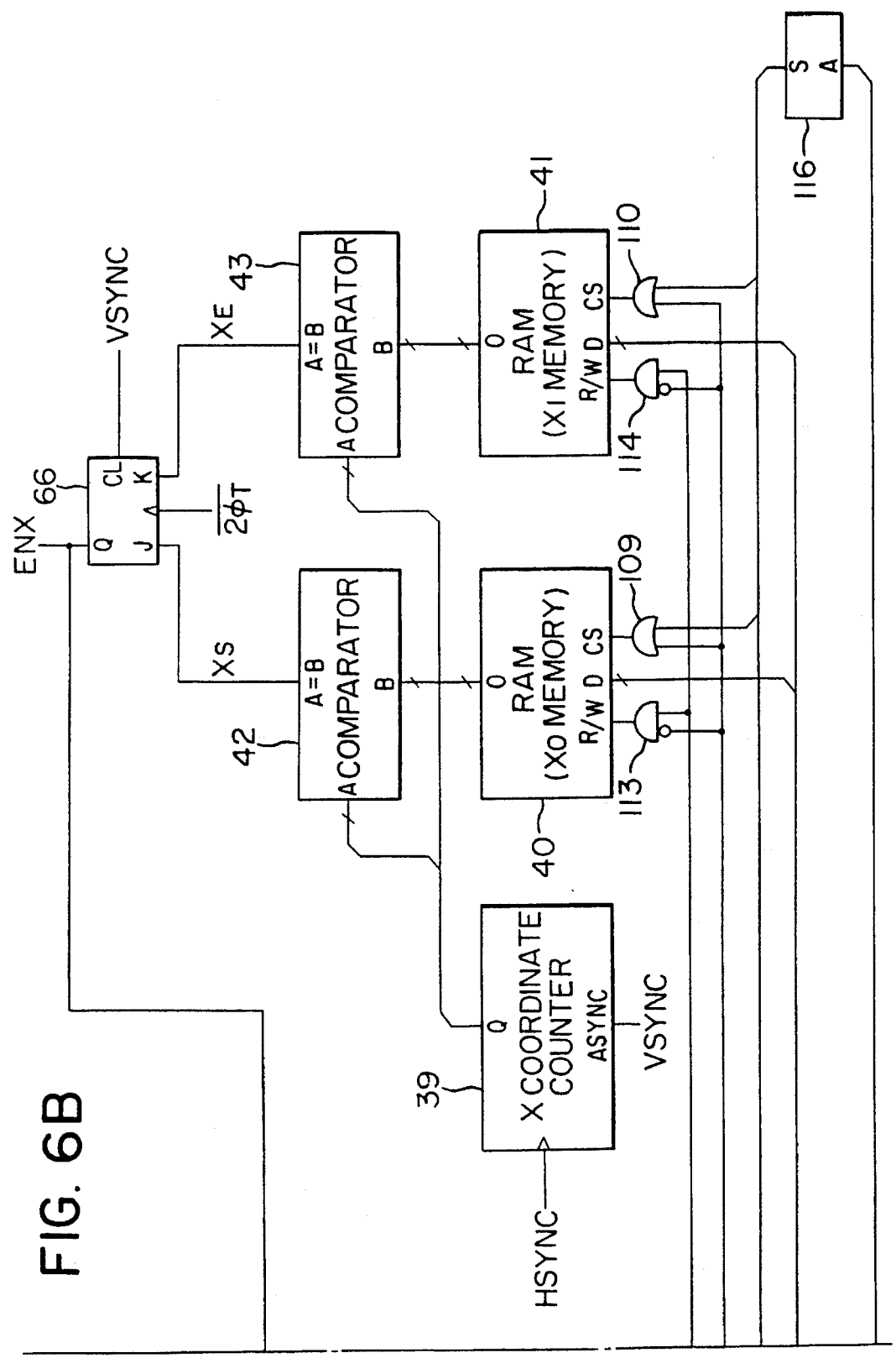

FIG. 6 is a detailed block diagram of the XY-coordinate detecting circuit shown in FIG. 2, wherein the components same as those shown in FIG. 2 are represented by same numbers.

A Y-coordinate counter 34 is reset by a horizontal synchronizing signal HSYNC and counts the clock pulses $2\phi T$ to release the address in main scanning. Also an X-coordinate counter 39 is reset by the signal VSYNC and releases the address in the auxiliary scanning by counting the signal HSYNC. The data storage into the memories 35, 36, 40 and 41 is conducted in the same manner as that for the memories of the microcomputer MPU in the sequence controller 23. In the memory write-in mode where a DMA control line 118 is at the low-level state, AND gates 111–114 are opened to enable a read-write control line 119. Data input ports of the RAM memories 35, 36, 40, 41 are connected to a common data bus 61, and said memories are selected by chip-select ports CS thereof. A memory selecting decoder 116 decodes the address data supplied through an address bus line 117 and allots said memories in the address space of the microcomputer MPU in the sequence controller 23. In the DMA mode where the signal line 118 is at the high-level state, said memories are in the read mode and are made accessible regardless of the decoder 116 where the memory selection is made by the OR gates 107–110.

In case the data bus line of the microcomputer MPU in FIG. 6 is of an 8-bit structure not sufficient for the coordinate counters 34, 39 of a capacity of 12–13 bits, the memories 35, 36, 40, 41 store the X and Y coordinates in the 8-bit sliced form. In the foregoing explanation each of said memories 35, 36, 40, 41 stores one coordinate signal, but it is also possible to two or more coordinates in each memory and to time-sequentially read said coordinates.

As already explained in relation to FIG. 5, the signal read-out from the auxiliary image memory 8b, once started by the synthesis start signal $XY_S$, is completely synchronized with that of the main image memory 8a, with comparison of coordinates made for example at every 4 bits. Although the enable-of-composite signal EOC may show a fluctuation of several bits, the image itself does not show any change except the fluctuation in the relative position of the synthesized image. Consequently the time-sequential division need not be applied to every pixel but can be conducted for every 4 pixels for example in case of a division into four.

The access to the address counters 26, 29 and 46 by the sequence controller 23 can be made in a similar manner as that for the memories 35, 36, 40 and 41.

The comparators 37, 38, 42, 43 and the flip-flop 64, 66 are of same structures and same functions as those explained in relation to FIG. 2.

Figure 7A:
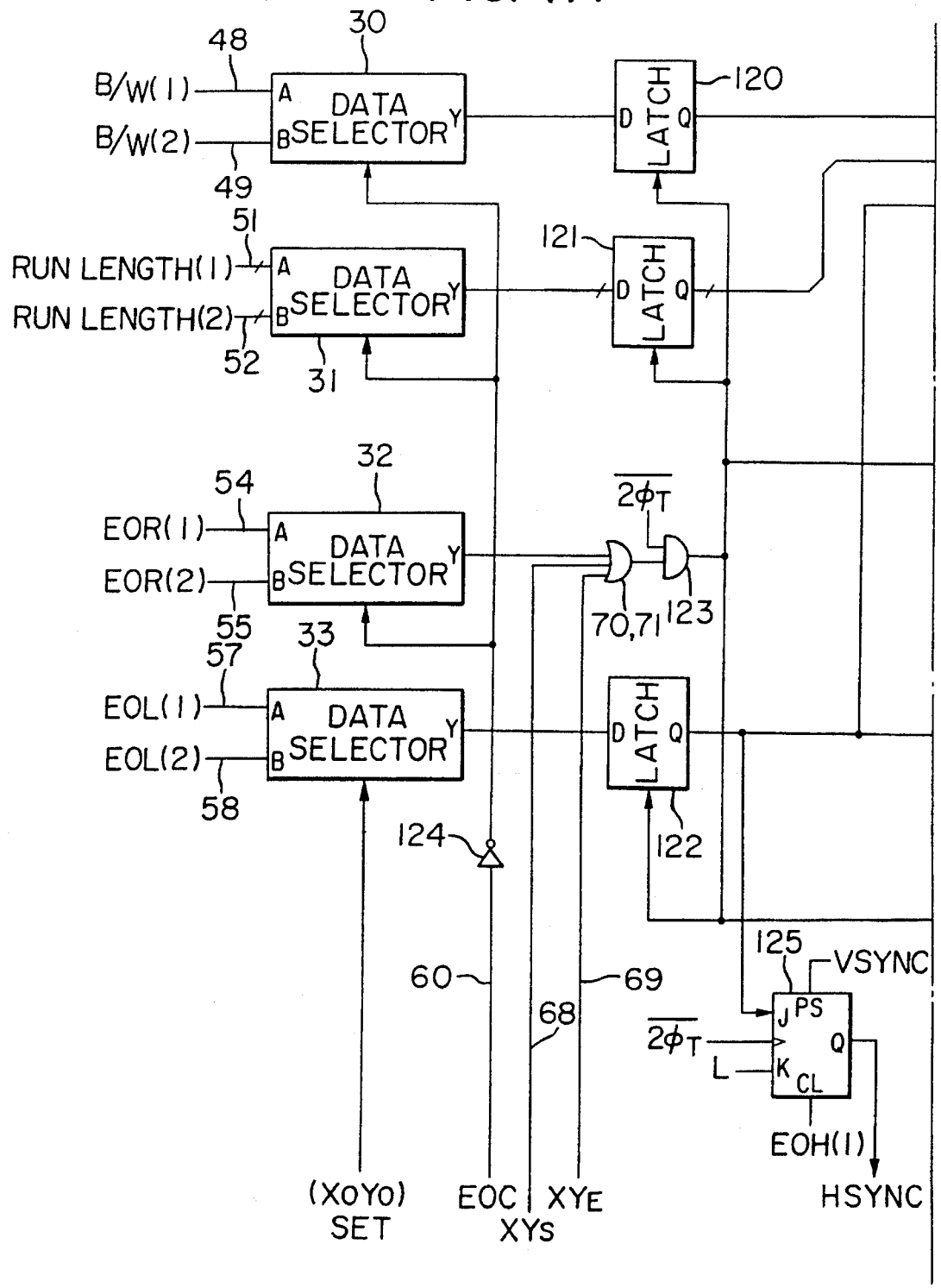

FIG. 7 is a detailed block diagram of a synthesized image compressor for storing the synthesized image in a compressed form. The EOC signal 60 selects the data selectors 30, 31 and 32 through an inverter 124. The signal EOR(1) or EOR(2) selected by the data selector 32 is added with signals $XY_S$ and $XY_E$ in the OR gates 70, 71 and is synchronized with the clock pulse $2\phi T$ in an AND gate 123 to form the signal EOR(3), thereby reading the data stored in latches 120, 121 and 122. Said signal EOR(3) is used also as a strobe signal for the M-H encoder 45 and an enable signal through an AND gate 129 and the latch 130 to the address counter 46. Consequently the data are read from the latches 120, 121 and 122 at each completion of run-length counting. During the image syntheses where the data selectors 30–33 respectively select the signals B/W(2), RUN(2), EOR(2) and EOL(2) in response to the signals EOC and (X0, Y0)SET, the signals B/W(3), RUN(3) and EOL(3) become related to the auxiliary image. Said signals however represent the main image when the image synthesis is not in progress.

The signal EOR(3) causes the M-H encoder 45 to encode the signals B/W(3), RUN(3) and EOL(3), and advances the address counter 46 by a step. The synthesized image thus M-H encoded is supplied through an AND gate 132 receiving the signal EOR(3) and the read-write signal, and is stored in the synthesized image memory 8c addressed by the address counter 46.

The signal EOL(3) is detected by a flip-flop 125 to generate a horizontal synchronizing signal HSYNC. The end of an image is detected by a shift register 126 and a 5-input AND gate 127, since the end of image is defined by 5 consecutive entries of the EOL(3) signals, and the output signal from said AND gate 127 is synchronized with the clock pulse $2\phi T$ in a flip-flop 128 to provide an end signal END. A signal $\overline{END}$ functions to stop the address counter 46 through an AND gate 129.

A flip-flop 131 generates a vertical enable signal VERT EN which is initiated by the signal VSYNC and is terminated by said signal END, and which represents that the image processing is in progress.

Figure 8:
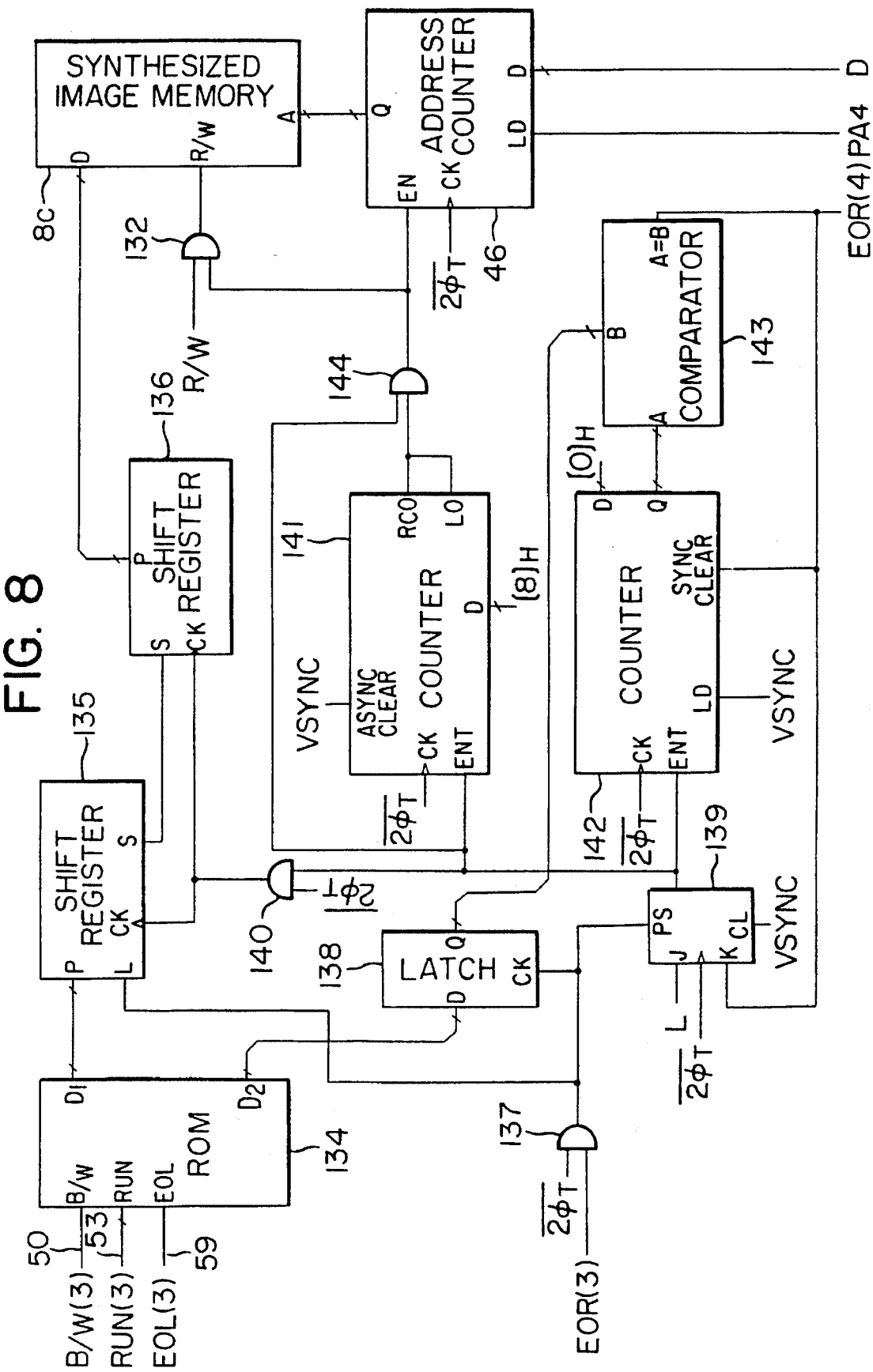
FIG. 8 is a block diagram of a modified Huffman encoder.

FIG. 8 is a detailed block diagram principally showing the M-H encoder 45 shown in FIG. 7. A ROM 134 for M-H encoding releases M-H code from a port D1 and the data length thereof from a port D2. A shift register 135 converts the parallel M-H code into a serial code. A shift register 136 reconverts said serially converted M-H code into 8-bit parallel data. In response to the end-of-run-length signal EOR(3), an AND gate 137 latches and loads the data in a latch 138 and a shift register 135 in synchronization with the clock pulse $2\phi T$. The latched data length D2 is supplied to an input port B of a comparator 143 and sets a flip-flop 139, thereby step advancing counters 141, 142 and shift register 135, 136. An 8-bit counter 141 step advances the address counter at every 8 bits, and causes the data reading from the memory 8c through the AND gate 132. The counter 142 measures the data length of the M-H code and supplies the result of said measurement to an input port A of a comparator 143, which resets the counter 142 and inverts the flip-flop 139 when the signals at A and B become mutually equal, thereby stopping the counters 142, 141 and the shift registers 135, 136. Also the address counter 46 is stopped through an AND gate 144.

Figure 9:
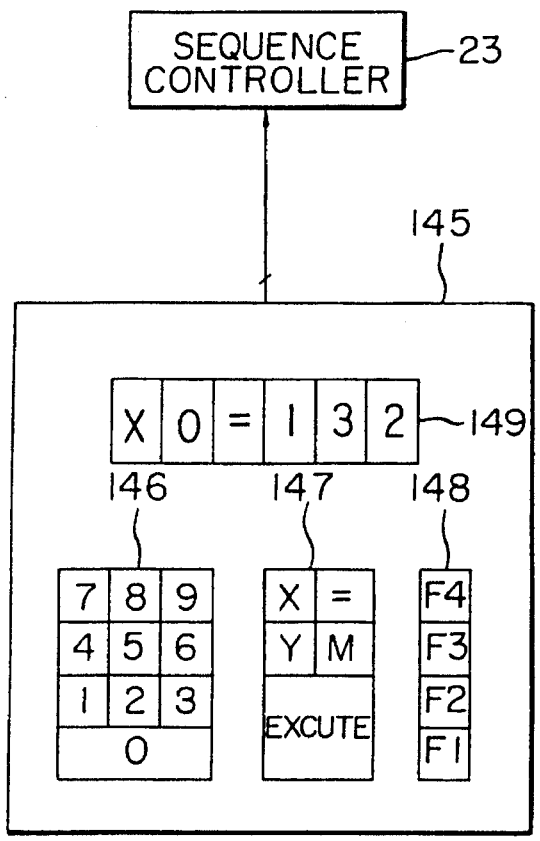
FIG. 9 is a schematic view of an embodiment of a coordinate input device.
Figure 10:
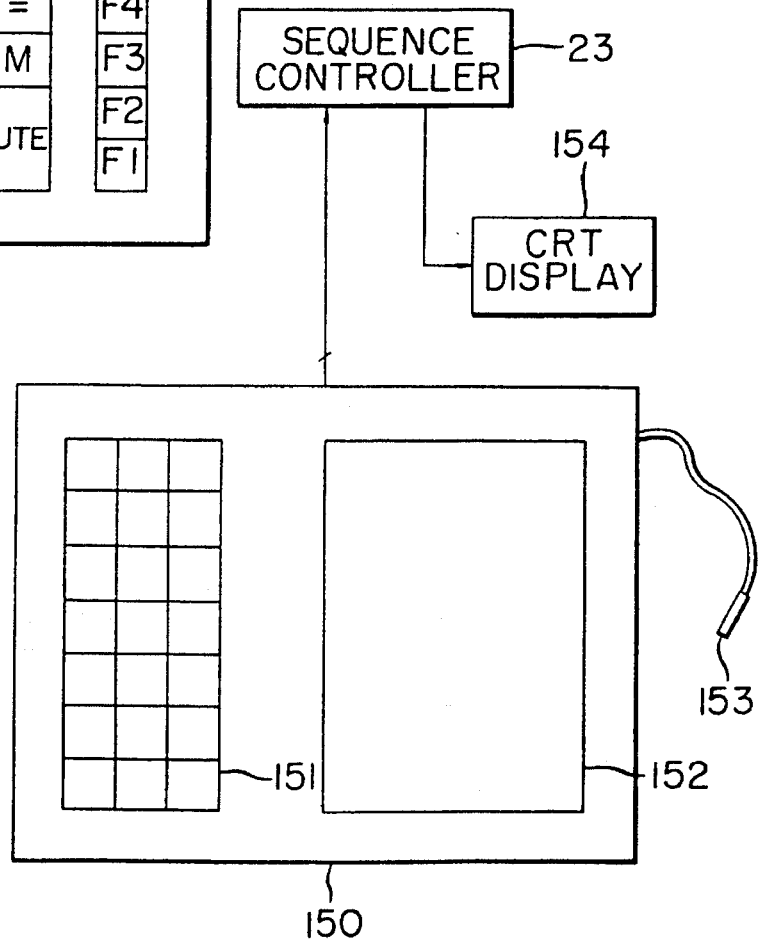
FIG. 10 is a schematic view of another embodiment of the coordinate input device.

FIGS. 9 and 10 show an example of the X, Y-coordinate input device. A simplified X, Y-coordinate input device 145 is provided with numeral keys 146; "X", "Y", "M" and "EXECUTE" keys 147; function keys 148; and a light-emitting display unit 149. In this device a coordinate X0=132 mm for example can be entered by the key actuations in the order of:

"X", "φ", "1", "3", "2" and "EXECUTE" whereby a display is shown on the display unit 149 as illustrated and a number corresponding to 132 mm is entered into the X0 memory 40 through the sequence controller 23. Other coordinates can be entered in a similar manner. The EXECUTE key stores the data the entered and displayed data into the memory of the controller 23.

The function keys 148 recall the coordinate data registered by the EXECUTE key in order to avoid the trouble of repeating the coordinate entry. Also the M key selects a desired image from the image memory 8a, in combination with a numeral entry through numeral keys 146.

Figure 17:
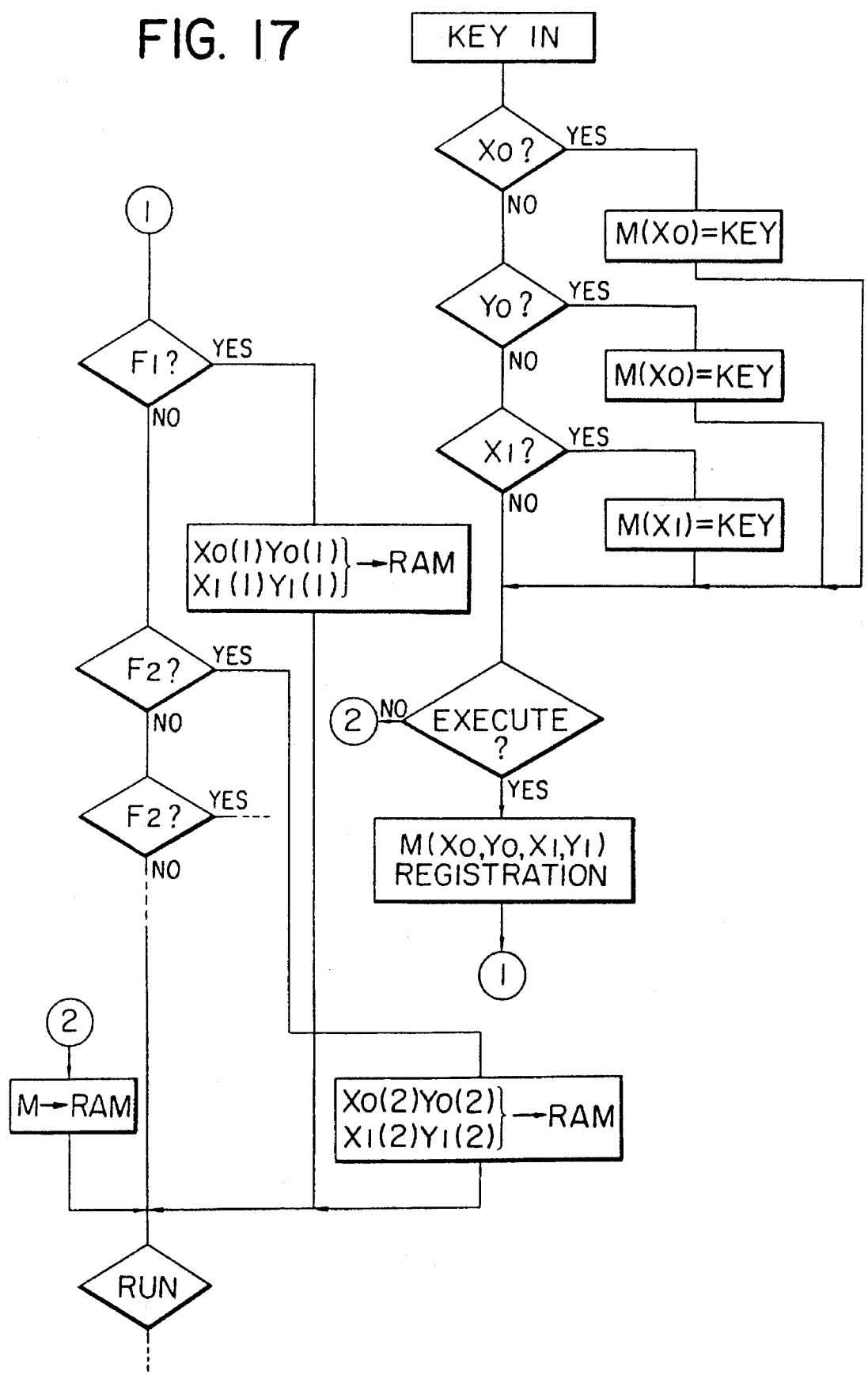
FIG. 17 is a control flow chart for the coordinate input.

FIG. 17 shows a control flow chart for controlling the data entry by the microcomputer of the sequence controller 23 in response to the actuations of the function keys. The numbers corresponding to X and Y coordinates are stored in the memory of said controller 23 by the key entry and are registered by the EXECUTE key. Thereafter the data X0(1), Y0(1), X1(1) and Y1(1) stored in the memory are set in the RAM by the function key F1. Other function keys are used in a similar manner.

The X, Y-coordinate input device shown in FIG. 10 enters the coordinates by contacting a coordinate designating area 152 on a digitizer 150 with a stilus pen 153 instead of numeral entry of the coordinates. It is therefore rendered possible to enter the desired positions by pointing the original document placed on said area 152 with said stilus pen 153. The designated area is graphically displayed in combination with characters on a cathode ray tube 154. A menu area 151 can be used for entering various commands. Said menu area 151 can be formed in a part of said digitizer 150 and can be distinguished from the coordinate area through the numerical identification by the sequence controller 23. Also the image addresses in the memory 8a can be designated by touching the numerals with said stilus pen.

As explained in the foregoing, the present invention, allowing synthesis of run-length encoded image signals, permits to reduce the capacity of the image memories, thereby reducing the cost of the apparatus. The present invention is not limited to the foregoing embodiment but is subject to variations within the scope of same basic principle.

Although the foregoing explanation is limited to the synthesis between run-length encoded image signals, the foregoing embodiment can easily perform image synthesis even when one of the image signals is not in the encoded form. In FIG. 1, the broken lines 18, 19 and 20 represent the flows of uncoded signals, and the synthesis of such signals is also included in the present invention.

Figure 18:
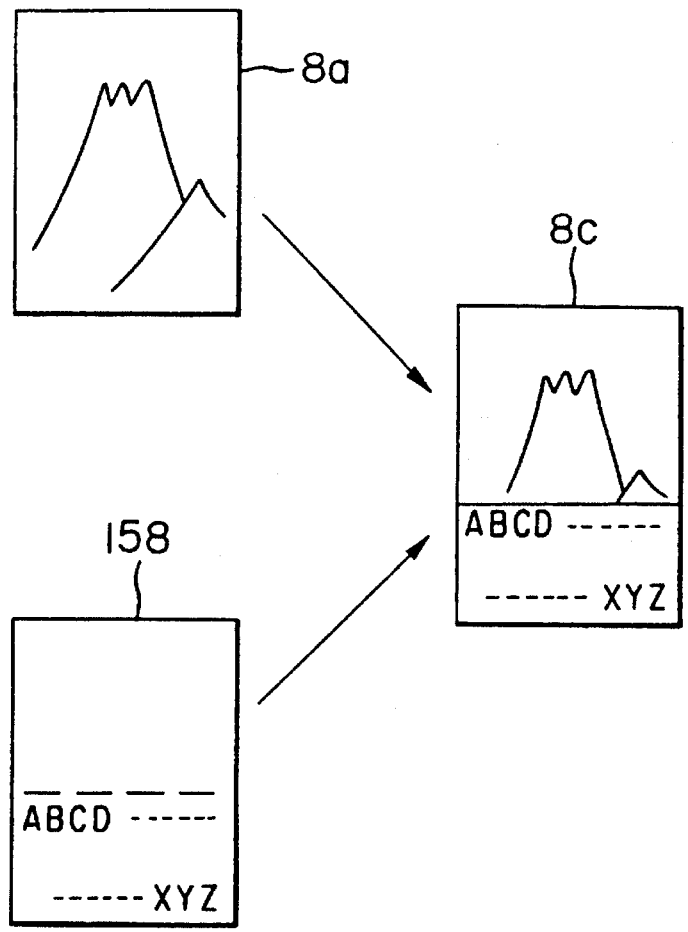
FIG. 18 is an explanatory view of character synthesis.

Also in the apparatus shown in FIG. 1, there may be provided a character generator 155 for fitting characters into the rectangular area in the synthesized image shown in FIG. 12. It is also possible to fit characters outside said rectangular area. FIG. 18 is a block diagram for synthesizing a run-length encoded image signal with an output signal from the character generator, wherein the same components as those in FIG. 2 are represented by same numbers. The embodiment shown in FIG. 13 serves to synthesize a run-length encoded image signal stored in the main image memory 8a with an output signal from a character generator composed of a buffer memory 158 and a character memory 157. The circuit shown in FIG. 13 is in fact same as that shown in FIG. 2 except that the auxiliary image expander (FIG. 5) is replaced by said character generator.

Address lines to said buffer memory 158 (RAM) either select the signals from a Y-coordinate counter 34 and from an X-coordinate counter 39 or an address bus line 177 of the sequence controller 23 through a data selector 159 controlled by a control line 160.

At first said control line 160 is controlled to store, in said buffer memory 158, a character format to be synthesized, which is supplied from the sequence controller 23 through a data bus line 61. Said storage can be achieved by entering alphanumeric characters either through the digitizer shown in FIG. 10 or through a typewriter or a word processor, and in this manner it is possible to enter a desired character arrangement for reproducing at an arbitrary position. The format is represented for example by the Askey code. Then the control line 160 is again controlled to connect the address lines of the buffer memory 158 to the Y- and X-coordinate counters 34, 39 for reading the already entered character codes at determined coordinates. The buffer memory 158, having a capacity corresponding to a page, can store plural characters corresponding to the coordinates determined by the input devices shown in FIGS. 9 and 10 in the aforementioned manner. The output signal from said buffer memory controls an add-bus of the character memory 157, thereby generating output signals for example for alphabetic characters corresponding to determined character codes. In this manner characters are obtained at a determined position as shown by 158 in FIG. 18. Said output signals are supplied to a run-length counter 161, run-length encoded to generate an auxiliary video signal 49, a real-time auxiliary image run-length signal 52 and an auxiliary image end-of-run-length signal 55 and synthesized with the main image signal. The function of the synthesizing circuit is same as that explained in relation to FIG. 2. In this manner it is possible to obtain a synthesized image as shown by 8c in FIG. 18.

Figures 13, 13A:
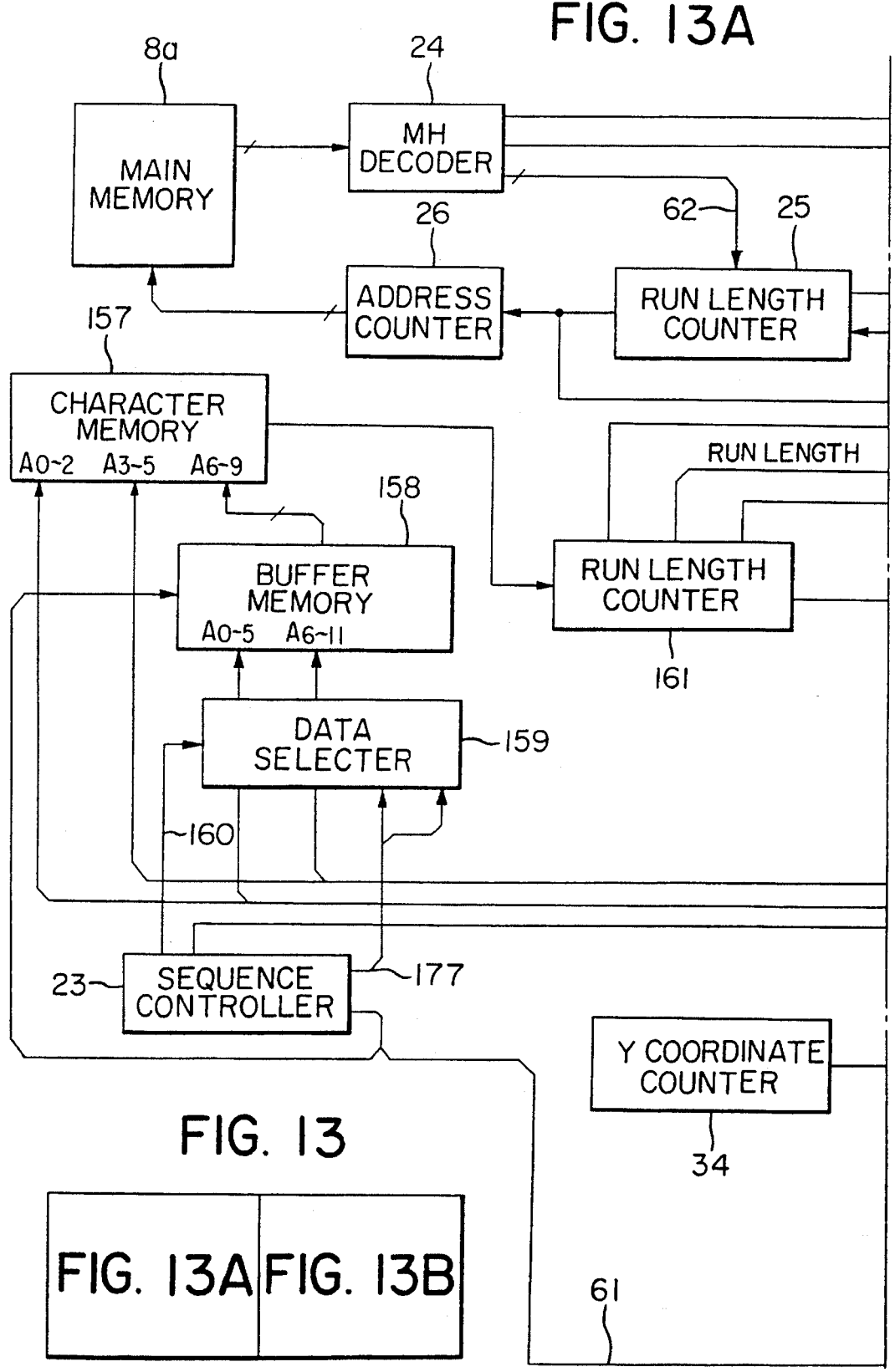
FIGS. 13, 13A and 13B are a block diagram of an apparatus synthesizing a run-length encoded image signal and a signal from a character generator.
Figure 13B:
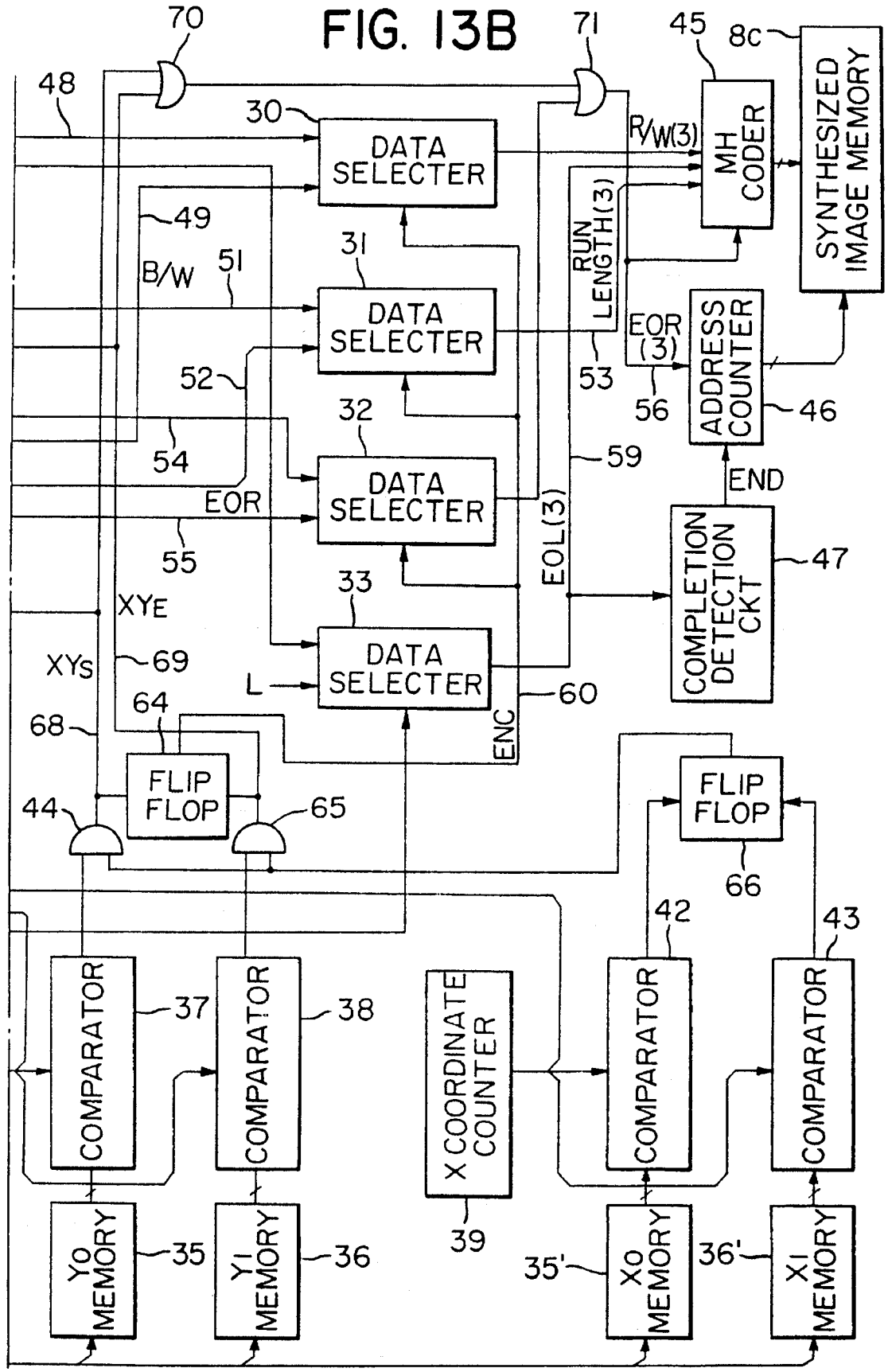
Figure 14:
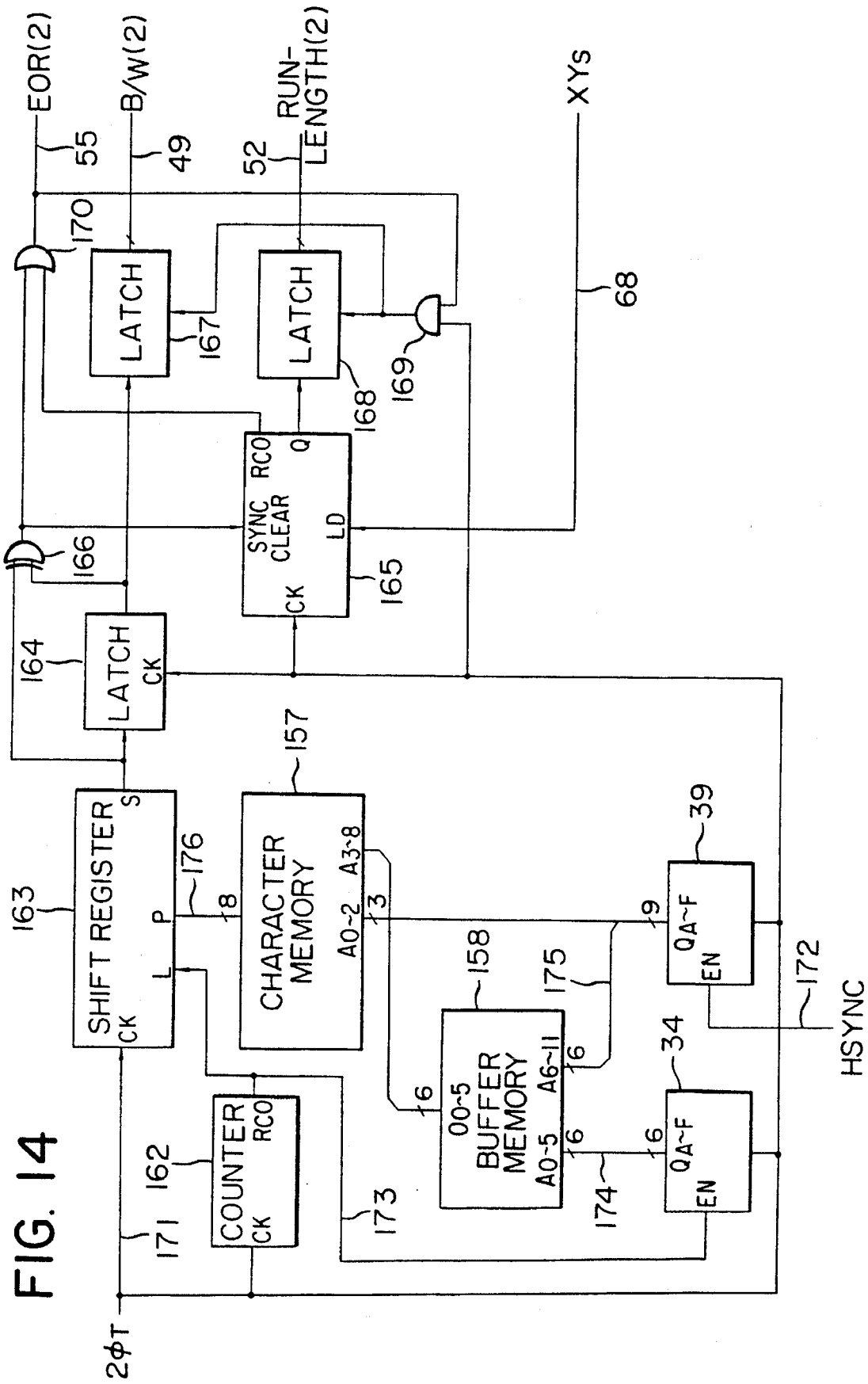
FIG. 14 is a block diagram showing the details of a principal part in FIG. 13.

FIG. 14 shows the details of the principal part in FIG. 13, wherein the character memory 157 is composed of a read-only memory (ROM) storing 64 characters each in 8×8 dot form. Address lines A0–A2 decode the lower 3 bits of the X-coordinate counter 39 to control the characters in the auxiliary scanning direction. Also address lines A3–A8 are utilized for selecting the characters. 8-bit parallel output signal supplied from the character memory 157 through output lines 176 are converted into a serial signal by a shift register 163, which performs data shifting in synchronization with the clock pulses 2φT and loads said parallel output signal through the lines 176 in response to a ripple output signal indicating the completion of said shift from an octanary counter 162. Said ripple output signal 173 is also utilized as an enable signal for the Y-coordinate counter 34, which is advanced in synchronization with the clock pulses 171 to select the succeeding character code stored in the buffer memory 158. The buffer memory 158 is composed of a random access memory (RAM) having a capacity of 4096 words of 6 bits, of which the address lines A0–A5 and A6–A11 are respectively utilized for selecting the Y-coordinate and X-coordinate of the character. 172 indicates the horizontal synchronizing signal. As explained above, the character generator is composed of the X-coordinate counter 39, Y-coordinate counter 34, buffer memory 158, character memory 157, shift register 163 and octanary counter 162.

The output signal from the shift register 163 is received by a latch 164, and an exclusive-OR circuit 166 detects the inversion point between black and white runs. A run-length counter 165 counts the clock pulses 171 and generates the ripple output signal RCO upon arrival at a determined value, thereby generating the auxiliary image end-of-run-length signal 55 EOR(2) through an OR gate 170. When the exclusive-OR gate 166 releases a high-level output signal in response to the inversion between black and white runs, the run-length counter 165 is cleared and simultaneously generates the signal EOR(2) through the OR gate 170. In this state the run length latched in the latch 168 generates the real-time auxiliary image run-length signal 52 RUN(2). Also the video signal supplied through a latch 164 is latched by a latch 167 to generate the auxiliary image video signal 49 (B/W(2)). An AND gate 169 is used for latching the signal EOR(2) in synchronization with the clock pulse 171. Also the synthesis start signal $XY_S$ 68 is used for clearing the run-length counter 165.

As explained in the foregoing, the synthesizing apparatus of the foregoing embodiment can also be applied to the synthesis of a run-length encoded image signal with another image signal, for example an image signal from a character generator.

What I claim is:

1. An image synthesis apparatus comprising:

first generating means for generating a first image signal representing a first image;

second generating means for generating a second image signal, which is compressed and coded, representing a second image;

first decoding means for decoding the second image signal;

designating means for designating a desired area of the first image and a desired area of the second image, the sizes of both desired areas being the same;

synthesis means for synthesizing the first and second image signals;

selection means for selecting, for input to said synthesis means, between the first image signal from said first generating means and a decoded second image signal from said first decoding means;

control means for controlling said selection means to select the decoded second image signal from said first decoding means within the desired area of the first image designated by said designating means, and to select the first image signal from said first generating means outside the desired area of the second image designated by said designating means, thereby to cause said synthesis means to form a third image signal representing a third image which is a synthesis of the first image outside the desired area of the second image and the second image within the desired area of the second image;

encode means for compressing and coding the third image signal, the compressed code format of said third image signal being the same as that of the second image signal;

memory means for storing a page of coded and compressed synthesized image signal encoded by said encode means;

second decoding means for decoding the coded and compressed synthesized image signal; and print means for printing a decoded synthesized image which is decoded by said second decoding means.

2. An image synthesis apparatus according to claim 1, wherein said control means causes generation of the first image signal by said first generating means in synchronism with the decoding of the second image signal by said decoding means.

3. An image processing apparatus comprising:

read means for reading a first image and generating a first image signal representative of the first image;

memory means for storing a second image signal, which is compassed and coded, representing a second image;

first decoding means for decoding the second image signal read out from said memory means;

designating means for designating a desired area of the first image and a desired area of the second image the sizes of said both desired areas being same;

synthesis means for synthesizing the first and second image signals;

selection means for selecting, for input to said synthesis means, between the first image signal from said read means and a decoded second image signal from said first decoding means;

control means for controlling said selection means to select the decoded second image signal from said first decoding means within the desired area of the first image designated by said designating means, and to select the first image signal from said read means outside the desired area of the second image designated by said designating means, thereby to form a third image signal representing a third image which is a synthesis of the first image outside the desired area of the second image and the second image within the desired area of the second image;

encode means for compressing and coding the third image signal, a compressed code format of said third image signal being the same as that of the second image signal;

memory means for storing a page of coded and compressed synthesized image signal encoded by said encode means;

second decoding means for decoding the coded and compressed synthesized image signal; and print means for printing a decoded synthesized image which is decoded by said second decoding means.

4. An image synthesis apparatus according to claim 1, wherein said second generating means comprises storage means for storing the second image signal.

5. An image synthesis apparatus according to claim 1, wherein said first generating means comprises read means for reading the first image to produce the first image signal.

6. An image synthesis apparatus according to claim 1, wherein said first generating means generates character image data representing at least one character.

7. An apparatus according to claim 1, wherein said designating means includes first designating means for designating a desired area with a pointing device and second designating means for designating a desired area by inputting numerals representing coordinates.

8. An apparatus according to claim 3, wherein said designating means includes first designating means for designating a desired area with a pointing device and second designating means for designating a desired area by inputting numerals representing coordinates.

* * * * *

UNITED STATES PATENT AND TRADEMARK OFFICE
CERTIFICATE OF CORRECTION

PATENT NO. : 5,524,071
DATED : June 4, 1996
INVENTOR(S) : YOSHIKAZU YOKOMIZO

It is certified that error appears in the above-identified patent and that said Letters Patent is hereby corrected as shown below:

TITLE PAGE:
AT [56] REFERENCES CITED

U.S. Patent Documents,
    "4,434,603" should read --4,434,503--.

COLUMN 2

Line 23, "object" should read --objects--.

COLUMN 3

Line 21, "thus" should read --the thus--.

COLUMN 4

Line 36, "auxiliary signal" should read
            --auxiliary image--.
    Line 59, "thus" should read --the thus--.

COLUMN 5

Line 63, "real time" should read --real-time--.

COLUMN 6

Line 41, "scanning" should read --scanning,--.

COLUMN 7

Line 49, "complation" should read --completion--.
    Line 65, "level." should read --level--.

UNITED STATES PATENT AND TRADEMARK OFFICE
CERTIFICATE OF CORRECTION

PATENT NO. : 5,524,071
DATED : June 4, 1996
INVENTOR(S) : YOSHIKAZU YOKOMIZO

It is certified that error appears in the above-identified patent and that said Letters Patent is hereby corrected as shown below:

COLUMN 9

Line 63, "two" should read --store two--.

COLUMN 10

Line 13, "flip-flop 64, 66" should read --flip-flops 64, 66--.

COLUMN 11

Line 18, ""$\phi$", "1"," should read --"$\phi$", "=", "1",--.
Line 23, "data the" should read --data--.
Line 41, "stilus" should read --stylus--.
Line 44, "stilus" should read --stylus--.
Line 52, "stilus" should read --stylus--.

COLUMN 12

Line 28, "Askey" should read --ASCII--.
Line 58, "signal" should read --signals--.

UNITED STATES PATENT AND TRADEMARK OFFICE
CERTIFICATE OF CORRECTION

PATENT NO. : 5,524,071
DATED : June 4, 1996
INVENTOR(S) : YOSHIKAZU YOKOMIZO

It is certified that error appears in the above-identified patent and that said Letters Patent is hereby corrected as shown below:

COLUMN 14

Line 20, "decoding" should read --first decoding--.
Line 25, "compassed" should read --compressed--.

Signed and Sealed this

Twenty-ninth Day of October 1996

Attest:

BRUCE LEHMAN

Attesting Officer    Commissioner of Patents and Trademarks